United States Patent
Clements et al.

(10) Patent No.: US 11,220,858 B2
(45) Date of Patent: Jan. 11, 2022

(54) QUICK-RELEASE CONTROL SYSTEM FOR ARCHITECTURAL OPENING COVERING AND METHODS FOR USING THE SAME

(71) Applicant: SecurShade Inc., Williston, VT (US)

(72) Inventors: Gordon M. Clements, Swanton, VT (US); Stephen Knieriem, Essex Junction, VT (US); Brian McCarthy, Swanton, VT (US); Christopher C. Coulter, Richmond, VT (US)

(73) Assignee: SecurShade Inc., Williston, VT (US)

( * ) Notice: Subject to any disclaimer, the term of this patent is extended or adjusted under 35 U.S.C. 154(b) by 567 days.

(21) Appl. No.: 16/039,794

(22) Filed: Jul. 19, 2018

(65) Prior Publication Data

US 2018/0320442 A1 Nov. 8, 2018

Related U.S. Application Data

(63) Continuation of application No. 14/971,594, filed on Dec. 16, 2015, now Pat. No. 10,030,443, which is a
(Continued)

(51) Int. Cl.
*E06B 9/68* (2006.01)
*E06B 9/322* (2006.01)
(Continued)

(52) U.S. Cl.
CPC .............. *E06B 9/68* (2013.01); *A47H 1/14* (2013.01); *E06B 9/322* (2013.01); *E06B 9/38* (2013.01);
(Continued)

(58) Field of Classification Search
CPC ..... E06B 2009/6809; E06B 2009/6818; E06B 9/68; E06B 9/322; E06B 9/38; F16D 48/06; F16D 27/02; A47H 1/14
See application file for complete search history.

(56) References Cited

U.S. PATENT DOCUMENTS 4,850,418 A * 7/1989 Bresson ............... E06B 9/74 160/310
5,447,477 A * 9/1995 Bresson ............... E06B 9/74 160/310
(Continued)

FOREIGN PATENT DOCUMENTS

| FR | 2451992 A1 * | 10/1980 | ............. E05G 7/004 |
| GB | 2257470 A * | 1/1993 | ............. E05G 7/004 |
| GB | 2264332 B * | 5/1996 | ............. A62C 2/247 |

OTHER PUBLICATIONS

Nufer, FR 2 451 992 machine translation; Retrieved from https://worldwide.espacenet.com/publicationDetails/biblio?CC=FR&NR=2451992A1&KC=A1&FT=D&ND=4&date=19801017&DB=&locale=en_EP (Year: 1980).*

*Primary Examiner* — Daniel P Cahn
*Assistant Examiner* — Abe Massad
(74) *Attorney, Agent, or Firm* — Downs Rachlin Martin PLLC

(57) ABSTRACT

Quick-release control systems for architectural opening coverings and associated control systems and methods for rapidly deploying the coverings to extended positions. In one embodiment coupling assemblies are provided for controllably coupling and decoupling portions of lifting mechanisms in a variety of covering systems, including roller and cellular shade systems. In yet other embodiments, control systems for controlling a plurality of coverings are provided, which may be configured to remotely and simultaneously deploying each of the plurality of coverings to an extended position in response to a trigger signal.

18 Claims, 23 Drawing Sheets

Related U.S. Application Data continuation of application No. 14/546,935, filed on Nov. 18, 2014, now Pat. No. 9,241,590.

(60) Provisional application No. 61/905,594, filed on Nov. 18, 2013.

(51) Int. Cl.
*A47H 1/14* (2006.01)
*E06B 9/38* (2006.01)
*F16D 27/02* (2006.01)
*F16D 48/06* (2006.01)

(52) U.S. Cl.
CPC ............. *F16D 27/02* (2013.01); *F16D 48/06* (2013.01); *E06B 2009/6809* (2013.01)

(56) References Cited

U.S. PATENT DOCUMENTS

| | | | | |
|---|---|---|---|---|
| 5,711,360 A * | 1/1998 | Viotte | ...................... | E06B 9/62 160/133 |
| 6,155,324 A * | 12/2000 | Elliott | ...................... | A62C 2/18 160/1 |
| 6,223,802 B1 * | 5/2001 | Colson | ...................... | E06B 9/262 160/171 |
| 6,244,325 B1 * | 6/2001 | Miller | ...................... | E06B 9/62 160/310 |
| 6,588,705 B1 * | 7/2003 | Frank | ...................... | B64C 1/1469 244/118.5 |
| 6,924,730 B1 * | 8/2005 | Evans | ...................... | E06B 9/74 340/286.05 |
| 7,055,283 B2 * | 6/2006 | Hsieh | ...................... | E05F 15/40 160/188 |
| 7,699,144 B2 * | 4/2010 | Hsieh | ...................... | E05F 1/006 188/157 |
| 8,567,573 B2 * | 10/2013 | Hsieh | ...................... | E05F 15/72 188/156 |
| 8,807,294 B2 * | 8/2014 | Hsieh | ...................... | F16D 65/28 188/69 |
| 8,850,949 B1 * | 10/2014 | Lopez | ...................... | F41H 5/24 89/36.04 |
| 9,241,590 B2 * | 1/2016 | Clements | ................... | A47H 1/14 |
| 2011/0203754 A1 * | 8/2011 | Mullet | ...................... | E06B 9/72 160/405 |
| 2014/0060754 A1 * | 3/2014 | Hsieh | ...................... | A62C 3/14 160/7 |
| 2014/0318719 A1 * | 10/2014 | Hsieh | ...................... | E05F 15/72 160/133 |

* cited by examiner

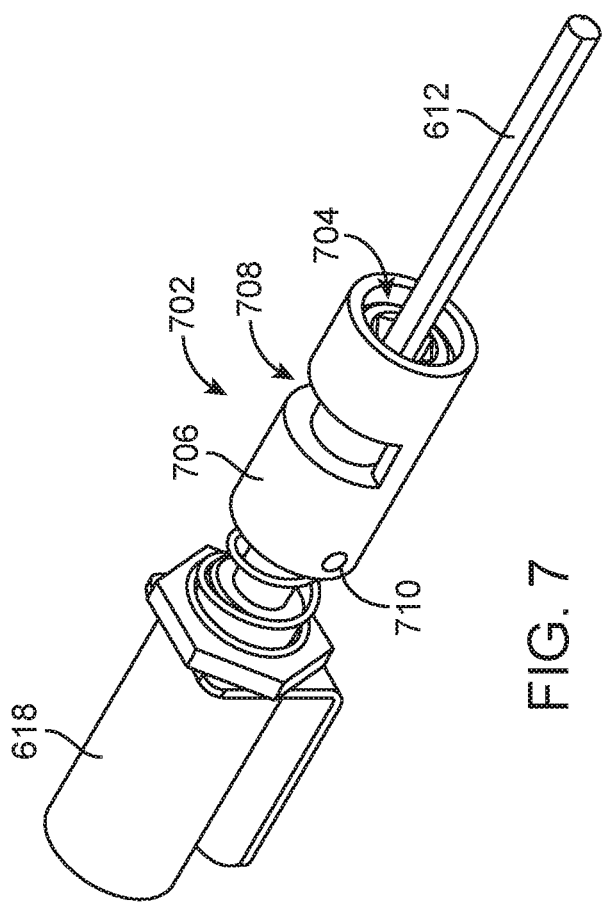
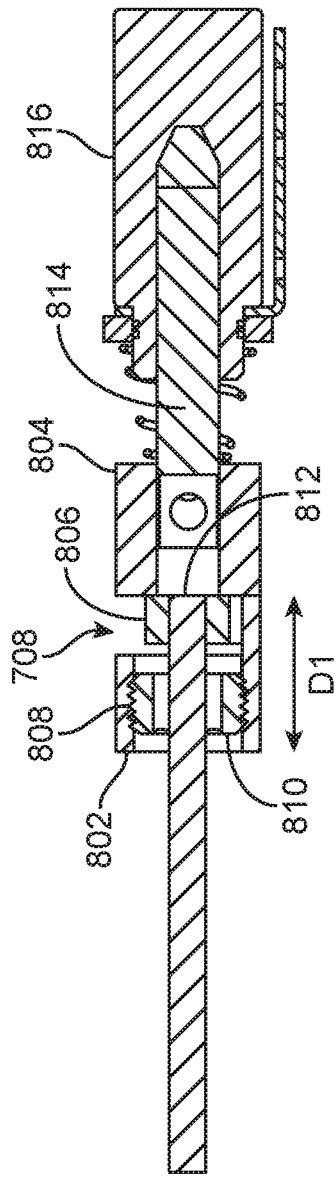
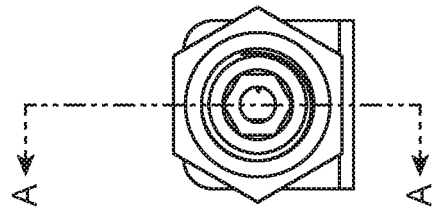
FIG. 7
FIG. 8A
FIG. 8B
SECTION A-A

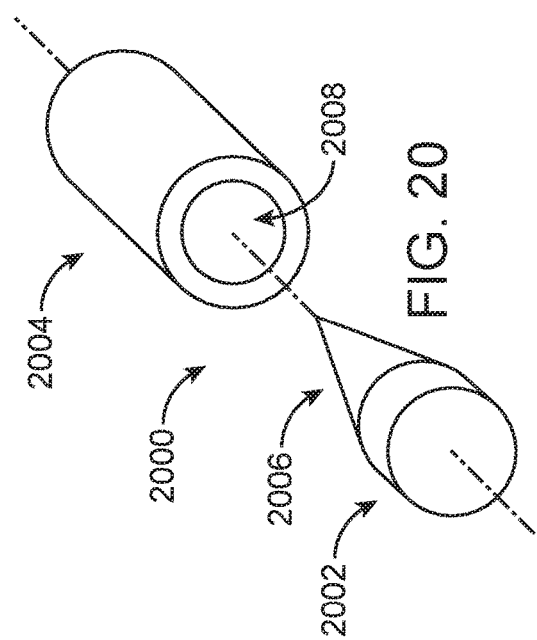
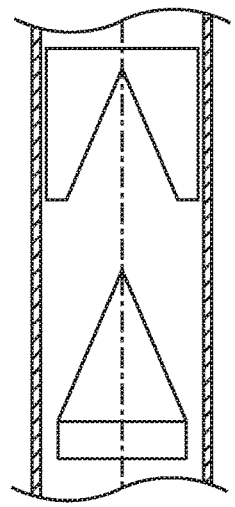
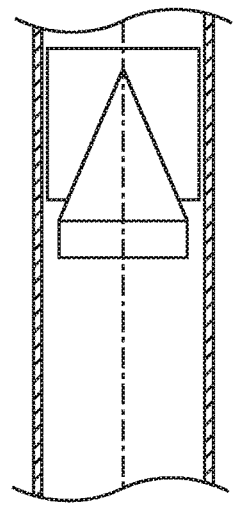
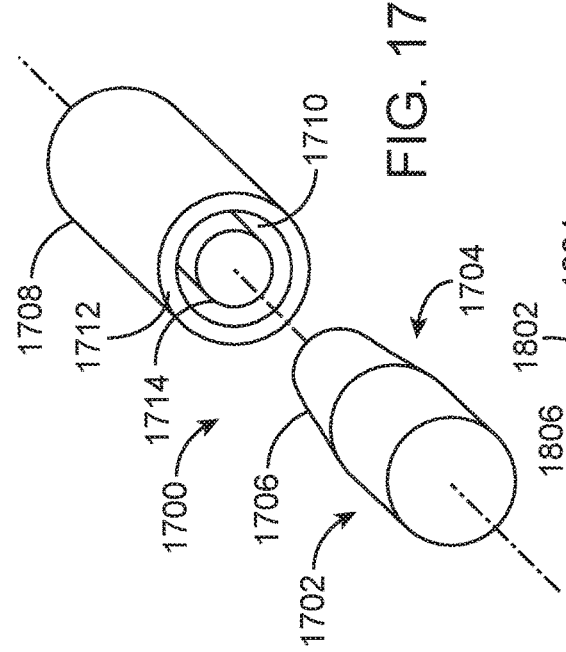
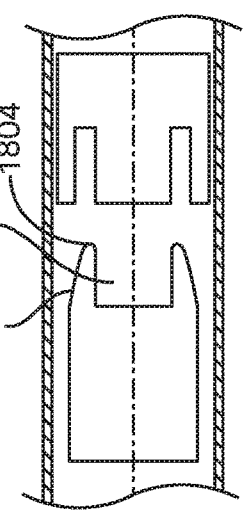
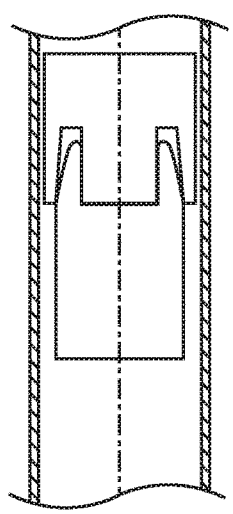

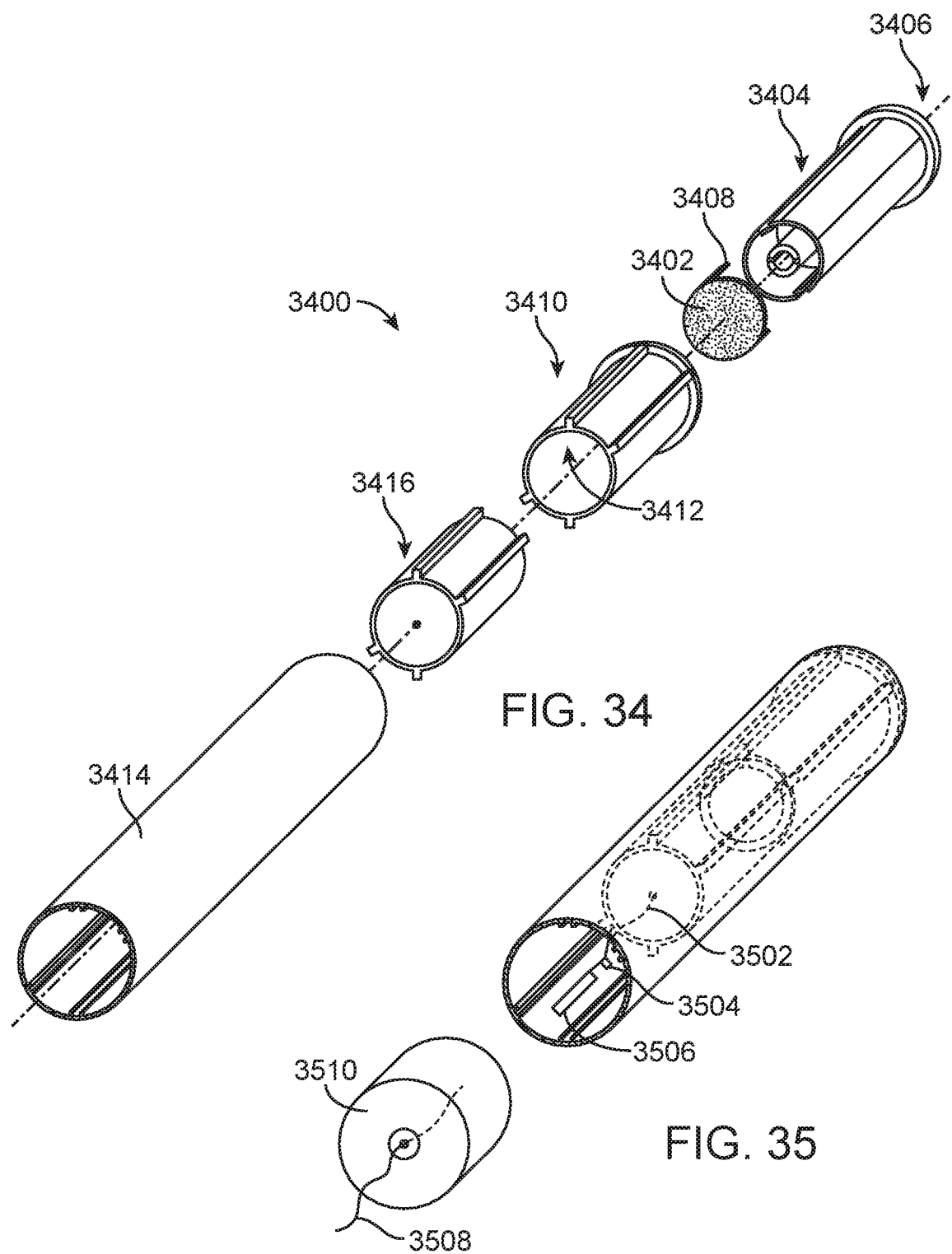

QUICK-RELEASE CONTROL SYSTEM FOR ARCHITECTURAL OPENING COVERING AND METHODS FOR USING THE SAME

RELATED APPLICATION DATA

This application is a continuation of U.S. patent application Ser. No. 14/971,594, filed on Dec. 16, 2015, and titled "Quick-Release Control System For Architectural Opening Covering," which application is a continuation of U.S. patent application Ser. No. 14/546,935, filed on Nov. 18, 2014, and titled "Quick-Release Control System For Architectural Opening Covering," now U.S. Pat. No. 9,241,590, which application claims the benefit of priority of U.S. Provisional Patent Application Ser. No. 61/905,594, filed on Nov. 18, 2013, and titled "Quick-Release Security Shade." Each of these applications is incorporated by reference herein in its entirety.

FIELD OF THE INVENTION

The present invention generally relates to the field of coverings for architectural openings. In particular, the present invention is directed to quick-release coverings for architectural openings and associated systems and methods.

BACKGROUND

Coverings for architectural openings such as windows, doors, and archways come in a variety of forms, including conventional draperies, shutters, horizontal and vertical blinds, various kinds of shades, including roller and cellular, and various combinations of one or more of the foregoing. Such coverings often include a control system to operate the covering, for example, for moving the covering between an extended and retracted position. Control systems often include one or more pull cords, pull tapes, tilt wands and/or motors which are operably coupled to or disposed in a head rail of the covering and that can be manipulated by an operator to move the covering between extended and retracted positions in an architectural opening.

Such coverings are used for a variety of purposes, including managing daylighting and thermal conditions of indoor spaces, reducing the ability to see through the architectural opening, as well as purely aesthetic or decorative purposes. Furthermore, providing a barrier for reducing or completely eliminating the ability to see through an architectural opening may be desirable for privacy purposes, and may also be needed in some instances for security purposes.

SUMMARY OF THE DISCLOSURE

In one implementation, the present disclosure is directed to a method for remotely triggering at least one window shade to extend to a closed position, the at least one window shade including a covering material, a lift mechanism, and a quick release mechanism. The method includes receiving a trigger signal; in response to the trigger signal, activating the quick release mechanism to decouple the lift mechanism; and in response to decoupling the lift mechanism, allowing the covering material to rapidly extend towards the closed position under the pull of gravity.

In another implementation, the present disclosure is directed to a method for remotely triggering a plurality of window coverings located in a plurality of rooms throughout a building, each of the plurality of window coverings including an electronically activated quick release mechanism. The method includes receiving an emergency signal; and in response to the emergency signal, simultaneously transmitting a trigger signal to each of the plurality of window coverings, wherein the trigger signal activates each of the quick release mechanisms, causing each of the window coverings to rapidly extend under the pull of gravity to a closed position.

In yet another implementation, the present disclosure is directed to a quick-release covering system for covering an architectural opening. The system includes a head rail, a bottom rail, and a covering material extending therebetween, said bottom rail configured to move relative to said head rail between a fully retracted position and a fully extended position; a control system configured to control a position of said bottom rail to thereby controllably move said bottom rail between the fully retracted and fully extended positions, said control system including; a lift mechanism, said lift mechanism including an elongate member extending along a first axis, and a clutch coupled to the elongate member, said clutch configured to transmit a rotational force to said elongate member to rotate said elongate member; and a quick-release mechanism including a coupling assembly, said coupling assembly configured to releasably couple said elongate member to said clutch, wherein said bottom rail is configured to move toward said fully extended position under the pull of gravity when said elongate member and clutch are decoupled by said coupling assembly These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a perspective view of the actuator and coupler of the system of FIGS. 6A and 6B;

FIG. 8A is an end view of the actuator and coupler of FIG. 7;

FIG. 8B is a cross sectional view of the actuator and coupler of FIG. 7;

FIG. 17 is a perspective view of an example coupler;

FIG. 18 is an elevation view of the coupler of FIG. 17 in an uncoupled configuration;

FIG. 19 is an elevation view of the coupler of FIGS. 17 and 18 in a coupled configuration;

FIG. 20 is a perspective view of an example coupler;

FIG. 21 is an elevation view of the coupler of FIG. 20 in an uncoupled configuration;

FIG. 22 is an elevation view of the coupler of FIGS. 20 and 21 in a coupled configuration;

FIG. 34 is an exploded perspective view of another example quick-release architectural covering system;

FIG. 35 is an assembled view of the system of FIG. 34;

DETAILED DESCRIPTION

Aspects of the present invention include quick-release control systems for architectural opening coverings and associated control systems and methods for remotely and rapidly deploying the coverings to extended positions. The quick-release control systems may include coupling assemblies for controllably coupling and decoupling portions of lifting mechanisms in a variety of covering systems, including roller and cellular shade systems. The present disclosure also includes control systems for controlling a plurality of coverings which may be configured to remotely and simultaneously deploy each of the plurality of coverings to an extended position in response to a trigger signal.

Figure 1:
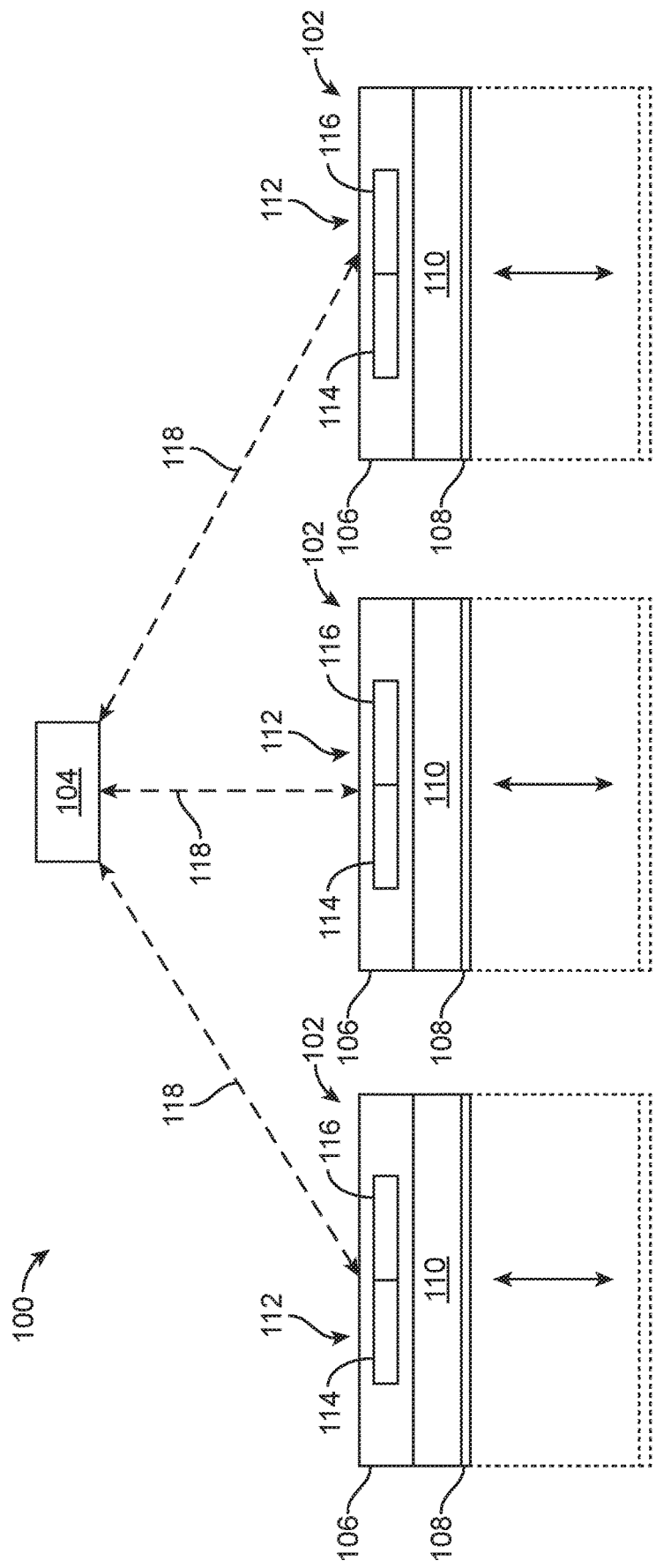
FIG. 1 is a conceptual diagram of an architectural opening covering control system having quick-release capabilities.

FIG. 1 illustrates an example embodiment of a quick-release covering system 100 including a plurality of coverings 102 for covering architectural openings and may also include one or more controllers 104 for remotely controlling one or more of the coverings. Coverings 102 may be any one of a variety types including but not limited to roller shade, horizontal blinds, cellular shades and combinations thereof. While system 100 includes only three coverings 102, this is for illustrative purposes only and the systems disclosed herein may scale from only one covering to virtually any number of coverings as desired. Also, the type of coverings 102 within a given system 100 may vary, such that some may be, for example, roller shades, while others may be cellular shades, or another type of covering. Each of coverings 102 may include head rail 106, bottom rail 108 and covering material 110 extending therebetween, and are configured to move between a retracted position and an extended position. The term head rail as it is used herein refers to structure at the top of any type of covering, including cellular or roller shade coverings, including structure for coupling and/or retracting covering material, as well as structure for attaching the covering to the architectural opening. By way of non-limiting example, the term head rail as it is applied to roller shades may include an elongate tube about which covering material is wound and the term head rail as it is applied to cellular shades may include an elongate shaft which may be coupled to lift cords for lowering and raising covering material. FIG. 1 illustrates example coverings 102 in an intermediate position with solid lines and shows the coverings in an extracted position in dotted lines. Bottom rails 108 may be raised closer to head rails 106 to a fully retracted position. Each of coverings 102 may include control system 112 which may be configured to control a position of one or more of bottom rails 108. As described more fully below, each of control systems 112 may include a lift mechanism 114, which may be used during normal operation of the covering to open and close the covering and for adjusting a position of bottom rail 106 between fully extended and retracted positions, and may be manually controlled, for example, by a pull cord, chain, or wand, or may be electronically controlled by a motor. Control systems 112 may also include quick-release mechanisms 116 that may be configured to controllably and rapidly release the covering so that corresponding bottom rail 108 may fall under the force of gravity to the fully extended position. As described more fully below, the present disclosure provides a variety of quick-release mechanisms 116 adapted for a wide range of coverings, and in addition to being configured to quickly release a covering, may also be configured to control the descent of bottom rail 108 and may be configured to cooperate with remote control systems for remote activation of the quick-release mechanism. For example, as shown in FIG. 1, controller 104 may be operably coupled to the quick-release mechanisms of one or more of coverings 102 and may be configured to send trigger signal 118 that may cause respective ones of the quick-release mechanisms 116 to be activated and thereby release one or more coverings 102, allowing bottom rail(s) 108 and material 110 to fall under the force of gravity to fully extended positions.

As described more fully below, such covering systems, such as example system 100, may provide a variety of benefits and advantages, such as the ability to remotely and rapidly deploy a plurality of coverings 102 to their fully extended positions that may be, in some instances, located in a plurality of different geographic locations, for example, throughout a single room of a building, or throughout an entire building or across a plurality of buildings linked via one or more networks. Controller 104 may be configured to selectively send triggering signals 118 to one or more coverings 102 upon receipt of a command from an occupant of the building in which the coverings are located and/or upon receipt of an external signal, such as an emergency signal received from local authorities, or an emergency signal received from an emergency detection system, such as a gunshot detection system. One or more of the quick-release mechanisms 116 may also be activated locally, such as by sensors located proximate a respective covering 102. The quick-release mechanisms 116 of control systems 112 may be configured to receive a triggering signal 118 from a variety of different types of sensors, which, by way of non-limiting example may include acoustic, infrared, thermal, solar, smoke detector, and carbon monoxide sensors, among others. Further, system 100 may be wired, wireless, or a combination thereof. In one embodiment, such a system may be utilized in a municipal building, such as a school building in response to a threat, such as the threat of a shooter in or near the building, where safety protocols may call for lowering some or all architectural opening coverings 102 to block visibility into a room or space. Such a system may allow for all coverings 102 to be simultaneously lowered rapidly, which may provide near-instantaneous privacy and eliminate the need of an occupant to manually lower each covering 102, which may put the occupant in harm's way, and would take an unacceptably long period of time while his or her attention could be devoted elsewhere. While systems with motorized lift mechanisms may allow for a user to remotely lower one or more shades, such systems may take too long to lower the coverings to the extended position and may not be optimally configured to receiving and acting on signals requiring rapid and remote deployment of a plurality of coverings, such as in response to a shooting threat. Systems with motorized lift mechanisms may also be cost prohibitive such that embodiments disclosed herein may provide improve quick-release capability at a significantly reduced cost, including both the cost to purchase the device as well as installation costs. For example, embodiments disclosed herein may have significantly lower power requirements than motorized systems such that any power requirements may be provided by battery and the quick-release covering systems may not need to be connected to building line power. In other embodiments, quick-release mechanisms disclosed herein may be implemented in systems with motorized lift mechanisms for improved quick-release functionality.

Figure 2:
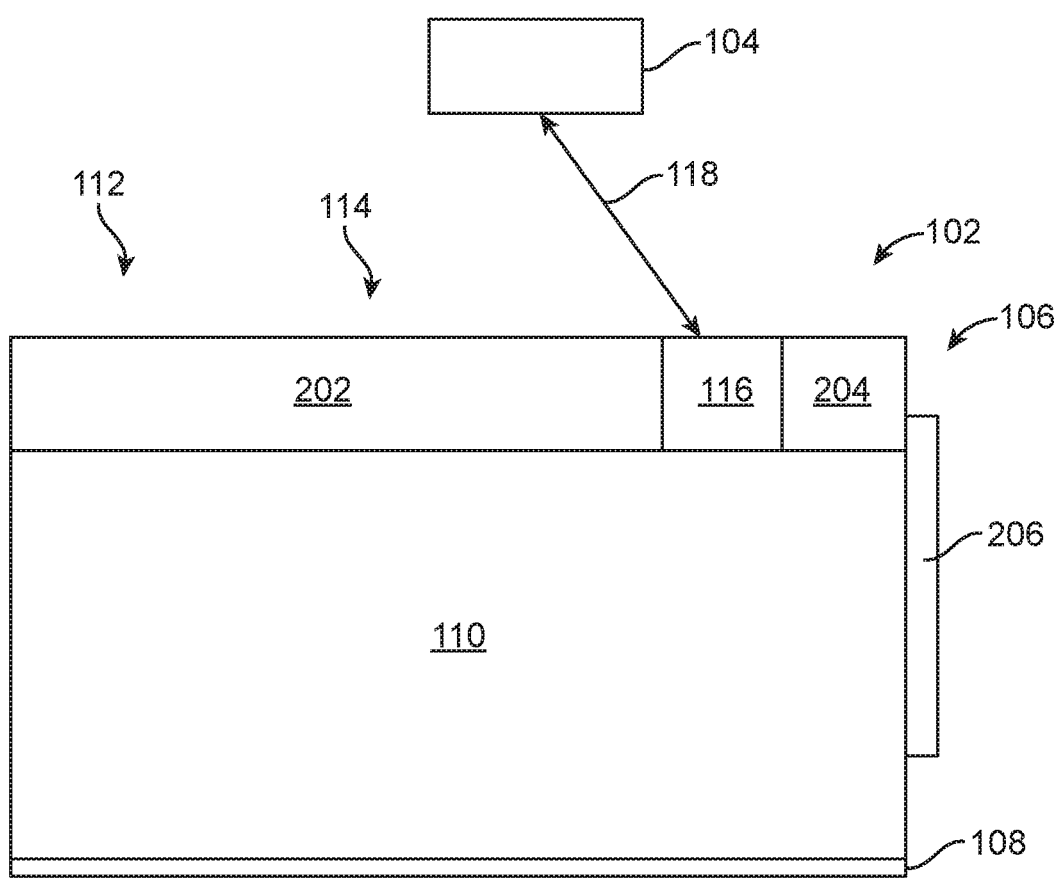
FIG. 2 is a conceptual diagram of one of the coverings of FIG. 1.

FIG. 2 conceptually illustrates one of example coverings 102 in greater detail. As described more fully below, covering 102 may have a variety of different configurations, including, for example a cellular shade or a roller shade, among others, which may influence the configuration of head rail 106, bottom rail 108, covering material, 110, and control system 112. As described above in connection with FIG. 1, example covering 102 may include control system 112, which in turn may include lift mechanism 114 and quick-release mechanism 116. Lift mechanism 114 may include elongate member 202, which may be coupled to covering material 110 and bottom rail 108 in a variety of different manners, and configured to be rotatably coupled within an architectural opening, such that other portions of the lift mechanism may be configured to rotate the elongate member, thereby adjusting a position of the bottom rail relative to the head rail. In some embodiments, lift mechanism 114 may also include clutch 204 and clutch member 206, where clutch member 206 may vary depending on, for example, the type of covering 102. For example, clutch member 206 may include one or more of pull cords or pull tapes or chain. As shown, clutch member 206 depends from clutch 204 and is configured to transmit a force from a user to the clutch, which in turn may transmit the force to the elongate member 202 to rotate the elongate member. When clutch member 206 is not moving, clutch 204 is configured to hold elongate member 202 in a fixed position, thereby preventing bottom rail 108 from moving downward under the force of gravity. Clutch 204 may have a variety of different configurations, including one or more gears or other mechanisms configured, for example, to transmit a linear force from clutch member 206 to a rotational force. As will be appreciated, in alternative embodiments including motorized lift mechanisms 114, the lift mechanisms may or may not have clutch 204 or clutch member 206.

In the illustrated embodiment, quick-release mechanism 116 may be configured to release elongate member 202 from other portions of lift mechanism 114 and thereby allow bottom rail 108 to fall under the pull of gravity and quickly and automatically transition covering 102 to a fully extended position. Although quick-release mechanism 116 is conceptually shown in FIG. 2 in a location between clutch 204 and elongate member 202, this is for illustrative purposes only and the quick-release mechanism may be located in a variety of other locations. As noted above, quick-release mechanism 116 may be configured to receive triggering signal 118 from controller 104, which may be located remotely, and may be hard-wired to covering 102, or may be configured to send the triggering signal wirelessly to the covering. As described and illustrated herein, quick-release mechanism 116 may have a variety of configurations and may include a coupling assembly and control unit. The coupling assembly may have a variety of configurations including having one or both of an electromechanical or electromagnetic coupler, which may include one or more of permanent magnets, electromagnets, linear actuators, solenoids, electro magnets, permanent magnets, pneumatic cylinders, hydraulic cylinders, voice coil actuators, piezo electric actuators, vibrating motors, interlocking members, antennas, receivers, control units, and local or remote power supplies.

Figure 3:
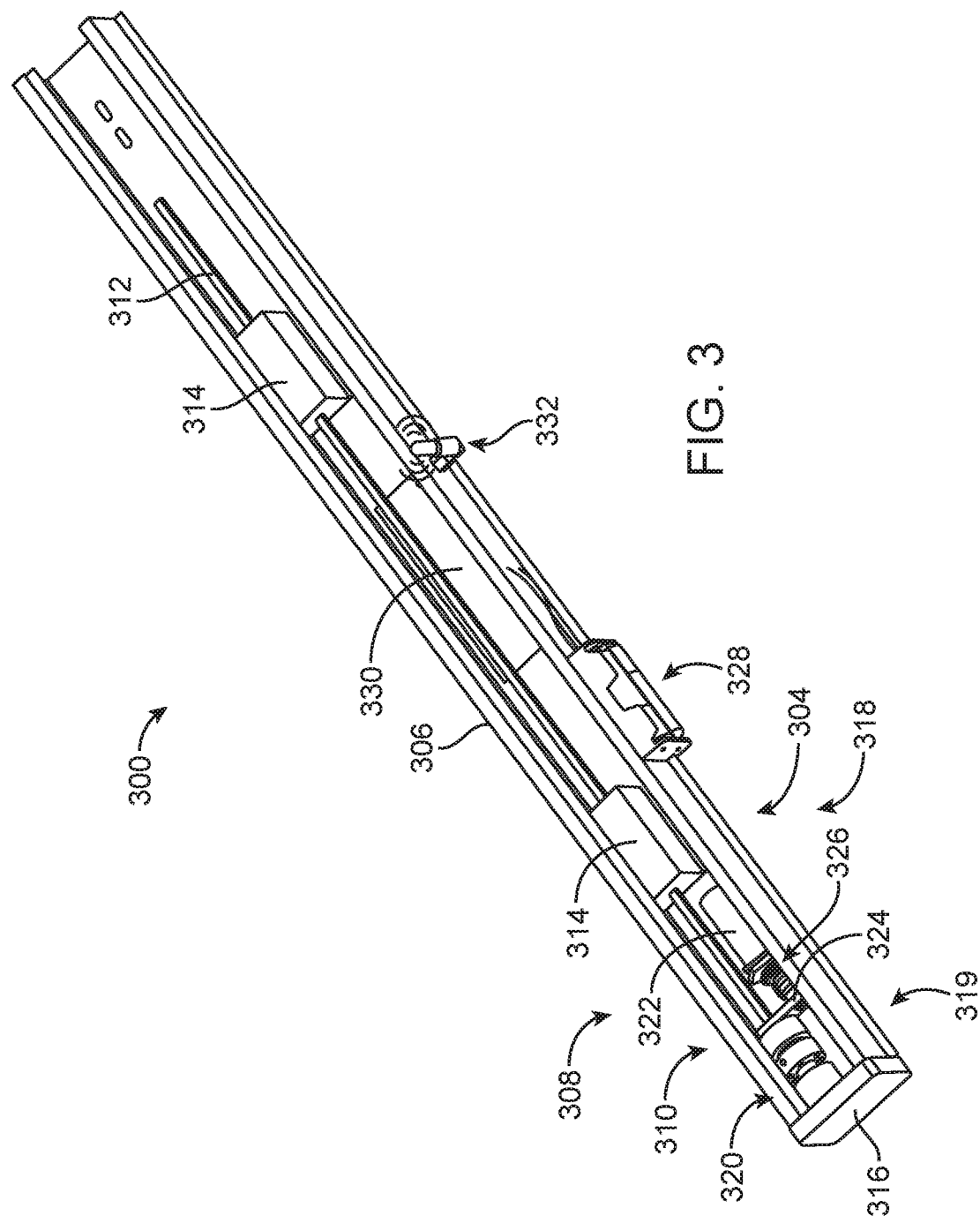
FIG. 3 is a perspective view of an example quick-release architectural covering system.
Figure 4:
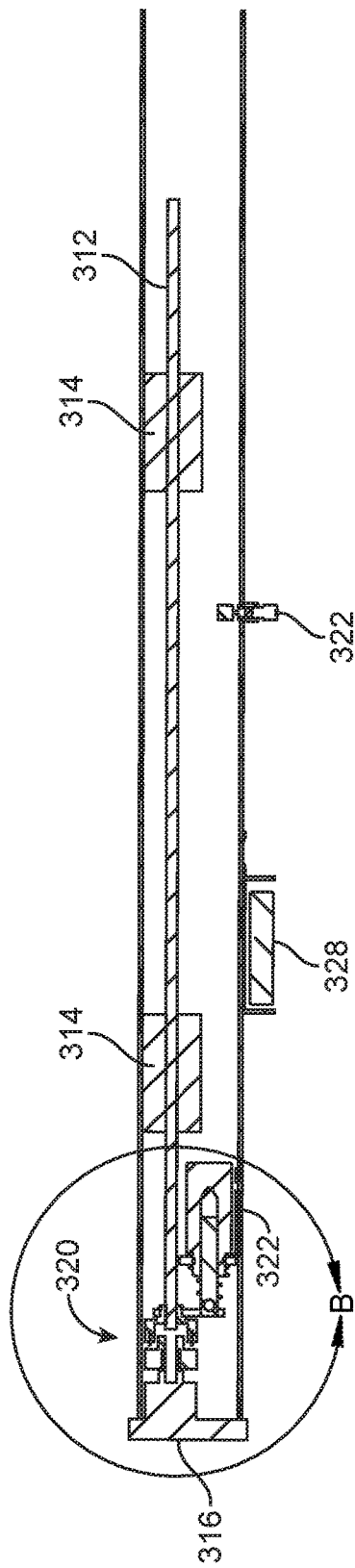
FIG. 4 is a top cross sectional view of the system of FIG. 3.
Figure 5:
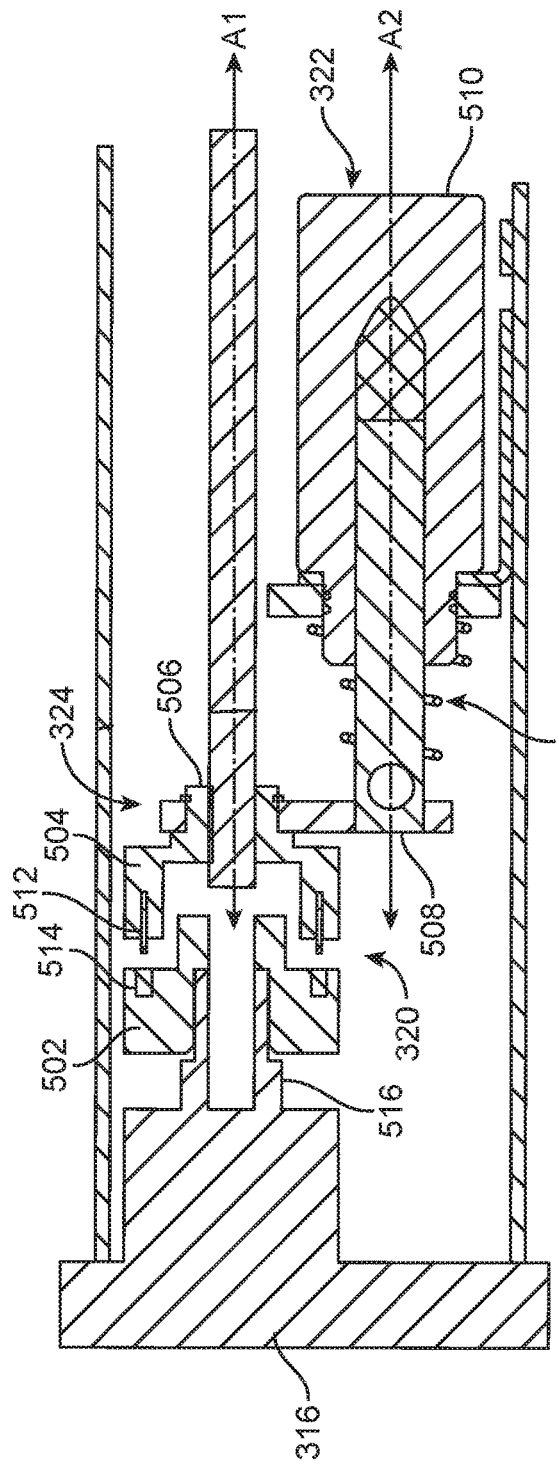
FIG. 5 is a detail view of the cross sectional view of FIG. 4.

FIGS. 3-5 illustrate an example embodiment of a quick-release covering system 300 embodied in an exemplary cellular shade having head rail 304 which may include housing 306 that may include a variety of components of control system 308. Illustrated control system 308 includes lift mechanism 310 which includes elongate shaft 312 rotatably disposed in housing 306 and coupled to lift cords (not shown) wound within spools 314. The lift cords wound within spools 314 may be coupled to a shade material and bottom rail of a cellular shade (not shown) such that, as elongate shaft 312 is rotated in one direction, the lift cord is wound within spools 314 to thereby shorten the lift cords and raise the bottom rail, and when the elongate rod is rotated in the other direction, the bottom rail will lower. For ease of comparison, head rail 304 corresponds to head rail 106 (FIGS. 1 and 2) and elongate shaft 312 corresponds to elongate member 202 (FIG. 2). Illustrated lift mechanism 310 may also include clutch 316, which corresponds to clutch 204 (FIG. 2), and which may be operably coupled to a clutch member (not shown), such as a pull cord, for example a continuous pull cord. During normal operation, lift mechanism 310 may be configured to controllably adjust a position of a bottom rail of shade 300 to virtually any position between a fully extended and fully retracted position by, for example, receiving a linear force from a user pulling on the pull cord, such linear force being transmitted via clutch 316 to elongate shaft 312 to thereby rotate the elongate rod and change a length of the pull cords disposed within spools 314. When illustrated clutch 316 is not being rotated, it is configured to hold elongate shaft 312 in a fixed position, thereby preventing the bottom rail from moving under the force of gravity.

In addition to lift mechanism 310, illustrated control system 308 also includes quick-release mechanism 318 which is designed and configured to rapidly deploy shade 302 to a fully extended position upon receipt of a trigger signal. Example quick-release mechanism 318 includes connection mechanism 319, which may include connection mechanism 320 and linear actuator 322. Example connection mechanism 320 includes first and second interlocking hubs 502, 504 (FIG. 5) which, as discussed more below, have complementary protrusions and recesses such that they may be rotatably coupled when the first and second hubs are brought into contact and the protrusions are inserted into the recesses. In the illustrated example, first hub 502 is fixedly coupled to clutch 316 and second hub 504 is fixedly coupled to elongate shaft 312, such that when first and second hubs 502, 504 are joined, a force received by clutch 316 from a user may be transmitted to elongate shaft 312. Exemplary linear actuator 322 is an electromagnetic solenoid linear actuator, and is fixedly attached to elongate shaft 312 via actuator coupler 324. As best seen in FIG. 5, actuator coupler 324 includes bearing surface 506 (FIG. 5) that permits relative rotational movement between shaft 312 and coupler 324. Illustrated linear actuator 322 may have a variety of configurations and specifications, depending on the application. For example, actuator 322 may be a pull-type solenoid which may be powered by DC current and generate a pulling force when so powered. For non-limiting example, in one embodiment, a STA® pull tubular solenoid, such as part number 152099 may be used. Alternative mechanical actuators disclosed herein may also be used. For example, in alternative embodiments, shade systems made in accordance with the present disclosure may utilize one or more of push linear actuators such as puch solenoids, pneumatic cylinders, hydraulic cylinders, linear actuators, voice coil actuators, piezo electric actuators, and/or vibrating motors.

Illustrated elongate shaft 312 extends along an axis A1 (FIG. 5) and is configured to move a distance D1 along axis A1. Thus, linear movement of actuator 322 may be transmitted to elongate shaft 312, causing the elongate rod to move along axis A1. In the illustrated embodiment, actuator 322 is positioned along a second axis A2 (FIG. 5), is substantially parallel to axis A1 of elongate member, and is proximate connection mechanism 320 and clutch 316, resulting in a compact arrangement within housing 306. Illustrated actuator coupler 324 extends along a plane substantially perpendicular to axes A1 and A2. Quick-release mechanism 318 also includes spring 326, positioned over shaft 508 (FIG. 5) of actuator 322 and positioned between housing 510 (FIG. 5) of the actuator and actuator coupler 324. Illustrated spring 326 has a conical shape, and resiliently biases actuator 322 to an extended position, thereby forcing first and second hubs 502, 504 together and coupling clutch 316 and elongate shaft 312. During normal operation of shade 302, actuator 322 may be de-energized, and spring 326 ensures clutch 316 is coupled to shaft 312.

Illustrated quick-release mechanism 318 also includes power source 328, control unit 330 and antenna 332. Antenna 332 is configured to wirelessly receive a trigger signal from an external source. Upon receipt of the signal, control unit 330 may be configured to send power from power source 328 to actuator 322 to thereby activate the actuator. When actuator 322 receives power, it may retract actuator shaft 508 (FIG. 5) into housing 510, thereby moving elongate shaft 312 along axis A1 and decouple connection mechanism 320. With connection mechanism 320 decoupled, clutch 316 is no longer preventing elongate shaft 312 from rotating, which allows the bottom rail to rapidly drop under the force of gravity, thereby rapidly deploying shade 300 to a fully extended position. Thus, quick-release mechanism 318 is configured to rapidly deploy shade 300 to a fully extended position upon receipt of a trigger signal. Illustrated control unit may have a variety of configurations. As shown in FIG. 3, quick-release mechanism 318 is powered by local power source 328. Power source may include one or more batteries for powering control unit 328 and actuator 322. In alternative embodiments, one or more of control until 330 and/or actuator 322 may be hardwired to a building power source. In alternative embodiments, the quick release mechanism may also include additional features for controlling the descent of the bottom rail, such as a resiliently biased friction material that may, when actuated, apply pressure to one or more of, for example, hubs 502, 504, to slow decent of a covering. In some embodiments, control unit may be configured to cooperate with the biased friction material to control the descent of the covering by, for example, pulsing actuator 322 on and off. In an alternative embodiment, actuator 322 may be configured so that it retracts actuator shaft 508 into housing 510 when power is removed rather than provided.

FIGS. 6A-10 illustrate an alternative quick-release covering system 600 having features and functions similar to system 300, with similar components having the same naming convention and with certain differences in design and function discussed below. As with system 300, exemplary system 600 is embodied in an exemplary cellular shade having head rail 602 including housing 604. Similar to control system 308, control system 606 includes lift mechanism 608 and quick-release mechanism 610. Lift mechanism 608 is substantially the same as lift mechanism 310, and similarly includes elongate shaft 612, spools 614, and clutch 616. As illustrated, alternative quick-release mechanism 610 may include control unit 620 and electromechanical coupling assembly 611. Electromechanical coupling assembly 611 may include connection mechanism 614 and linear actuator 618, which may be similar to connection mechanism 320 and actuator 322. Unlike quick-release mechanism 318, quick release mechanism 610 has an alternative arrangement where connection mechanism 614 is disposed in a first end of housing 604 and is coupled to a first end of elongate shaft 612, and actuator 616 is disposed in second end of the housing and is coupled to second end of the elongate shaft. Such an arrangement may include actuator 616 extending along an axis that is substantially coincident with elongate shaft 612, which may facilitate a slimmer, more compact arrangement of quick-release mechanism 610.

Figure 6A:
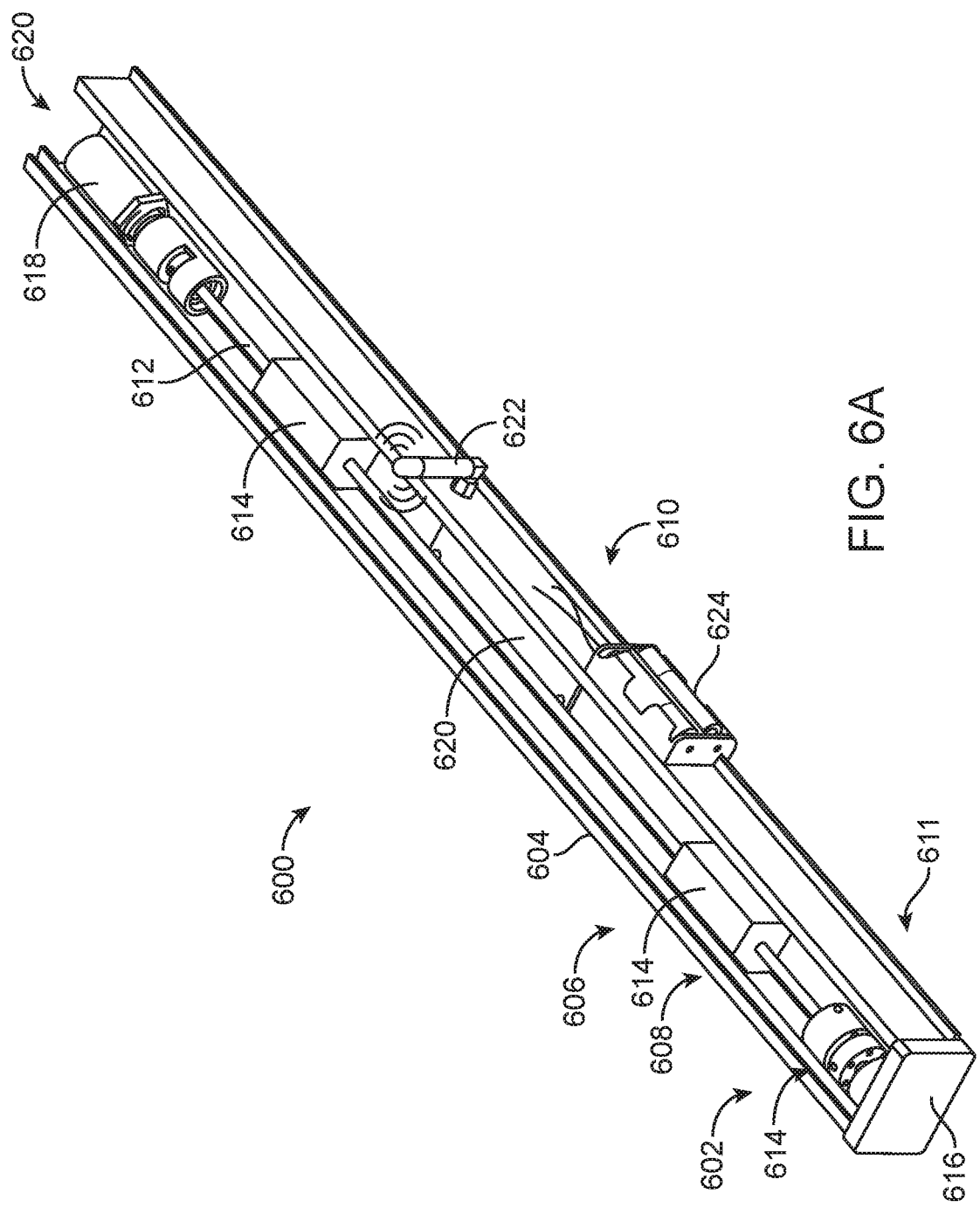
FIG. 6A is a perspective view of another exemplary quick-release architectural covering system in a coupled configuration.
Figure 6B:
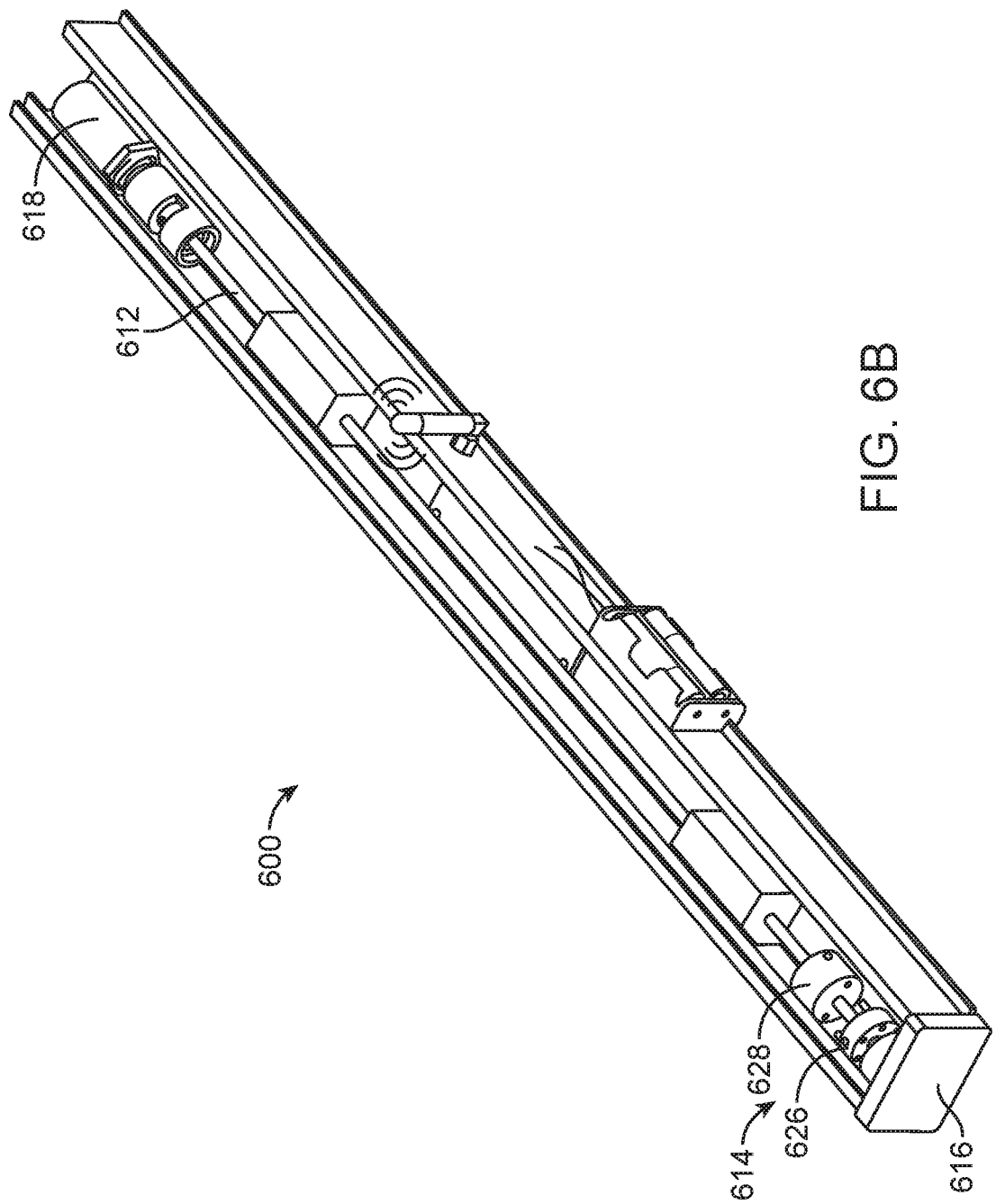
FIG. 6B is a perspective view of the system of FIG. 6A in an uncoupled configuration.

Similar to system 300, system 600 may include control unit 620 which may be configured to receive a trigger signal from antenna 622 and in response, send power from power source 624 to actuator 618. FIGS. 6A and 6B conceptually illustrate system 600 in a coupled state (FIG. 6A), where connection mechanism 614 is coupled for normal operation of the covering, and a decoupled state (FIG. 6B), in which control unit 620 has activated actuator 618, thereby causing the actuator to pull elongate shaft 612 and decouple first and second hubs 626, 628 (FIG. 6B) of connection mechanism 614. (Note, the distance between hubs 626, 628 shown in FIG. 6B is for illustrative purposes only and the actual distance between the hubs in the decoupled state may be less). With connection mechanism 614 decoupled, elongate shaft 612 may freely rotate, thereby allowing covering 600 to rapidly transition to a fully extended position.

FIGS. 7 and 8 provide more detailed illustrations of example actuator 618 and actuator coupler 702. As with actuator 322, example actuator 618 may be an electromagnetic solenoid linear actuator. As with actuator 322, alternative embodiments may include any one of a variety of different types of alternative actuators listed above. As shown in FIGS. 7 and 8, actuator 618 may be coupled to elongate shaft 612 by actuator coupler 702. Example actuator coupler 702 is configured to adjustably couple actuator 618 to shaft 612 in a linear orientation, with the actuator and the motion of the actuator extending along substantially the same axis as the rod. As shown, coupler 702 may be an elongate member having inner lumen 704 and having first and second ends 802, 804 (FIG. 8B), and an outer wall 706 with an opening 708 in an intermediate portion of the outer wall. Opening 708 may be sized and configured for insertion of shaft coupler 806 (FIG. 8) into inner lumen 704. Opening 708 may be utilized, for example, during assembly of shaft coupler 702 and shaft 612. Shaft coupler 806 may be inserted into opening 708 and elongate shaft 612 may then be inserted into first end 804 and then into the shaft coupler. Opening 708 may then provide access for a tool to fixedly couple shaft coupler 806 to shaft 612, such as with a set screw (not shown). Actuator coupler 702 may also include threaded portion 808 on an inner wall and be configured for threaded engagement with adjustment member 810. Adjustment member 810 may be configured to adjust a distance D1 between second end 812 of shaft 612 and first end 802 of actuator coupler 702. Such an adjustment may be used to set a position of actuator shaft 814 within actuator housing 816 when quick-release mechanism 610 is in an unenergized state. For example, actuator 618 may operate more efficiently, or have a greater pull force when shaft 814 is further inserted into housing 816. Thus, adjustment member may be utilized to position shaft 814 further into housing 816 when the actuator is in an unenergized state while also ensuring connection mechanism 614 (FIG. 6) is coupled. With actuator shaft 814 further inserted, when actuator 618 is energized, it may generate a larger pull force and more quickly and effectively decouple connection mechanism 614 than if it was starting from a less-inserted position. Second end 804 of actuator coupler 702 may be fixedly coupled to actuator shaft 8814 by, for example, a set screw which may be inserted through set screw opening 710 (FIG. 7).

Figure 9:
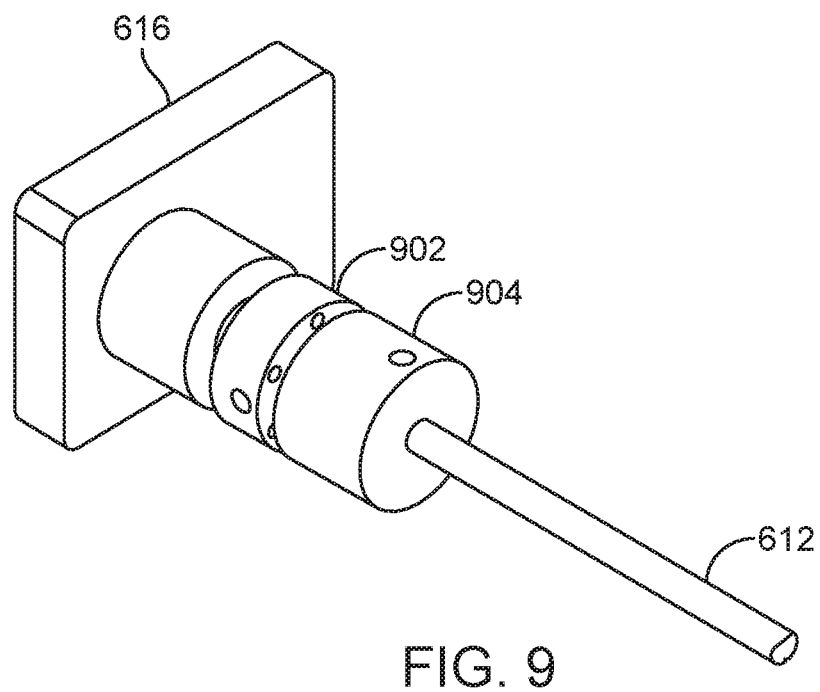
FIG. 9 is a perspective view of the shaft coupler of FIG. 7.
Figure 10:
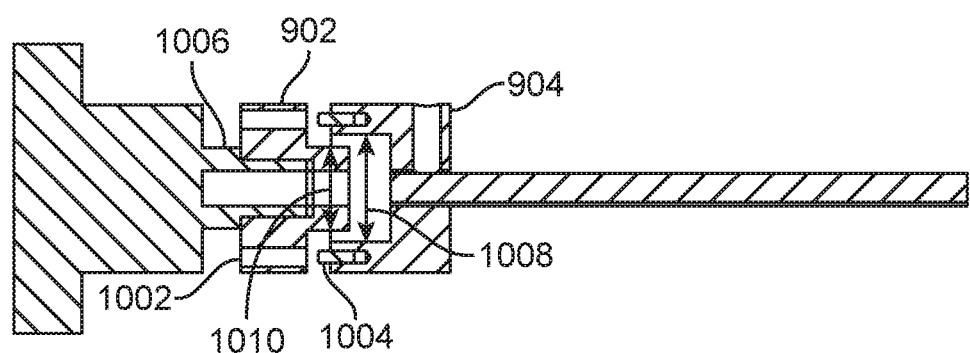
FIG. 10 is a cross sectional view of the shaft coupler of FIG. 9.

FIGS. 9 and 10 illustrate connection mechanism 614 in greater detail. As shown, connection mechanism 614 may include first and second interlocking hubs 902, 904 with complementary recesses and protrusions 1002, 1004 (FIG. 10, only one of each labeled to avoid clutter) for releaseably coupling clutch 616 to shaft 612. First hub 902 is fixedly coupled to shaft 1006 of clutch 616 and second hub 904 is fixedly coupled to elongate shaft 612, such that when first and second hubs 902, 904 are joined, a force received by clutch 616 from a user may be transmitted to elongate shaft 612. As shown, second hub 904 has a first inner diameter 1008 that is sized for sliding engagement with first hub 902 outer diameter 1010. Illustrated protrusions 1004 may be pins that are fixedly coupled to second hub 904 and sized for sliding engagement with recesses 1002. In alternative embodiments, second hub may have protrusions with alternative cross sections, and the protrusions may be integrally formed with the second hub. In the illustrated embodiment, second hub has two protrusions spaced 180 degrees apart and a larger number of recesses. In alternative embodiment, the number of protrusions and recesses may vary, for example one protrusion, or more than two protrusions, and 1-10 recesses. First and second hubs may be made from a variety of materials in including polymers and or metals, depending on strength, cost, wear and corrosion resistance and ease of manufacturability considerations.

Figure 11:
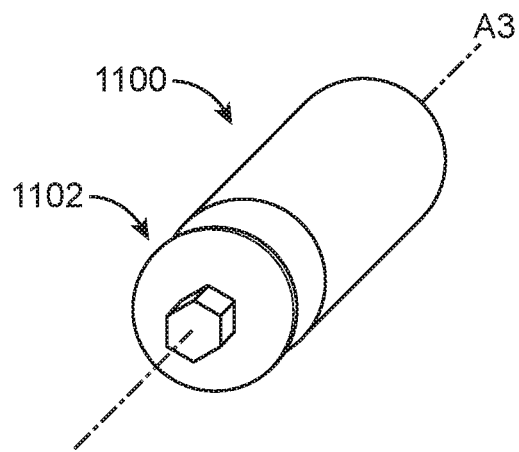
FIG. 11 is a perspective view of an example coupler.
Figure 14:
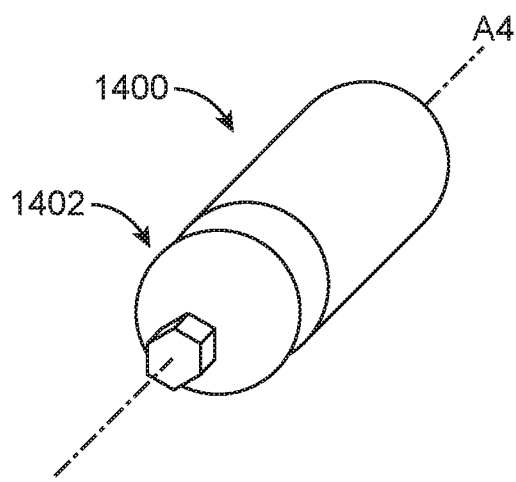
FIG. 14 is a perspective view of an example coupler.
Figure 12:
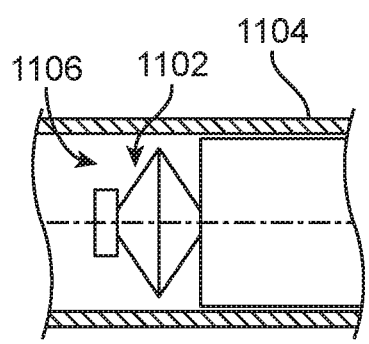
FIG. 12 is an elevation view of the coupler of FIG. 11 in an uncoupled configuration.
Figure 15:
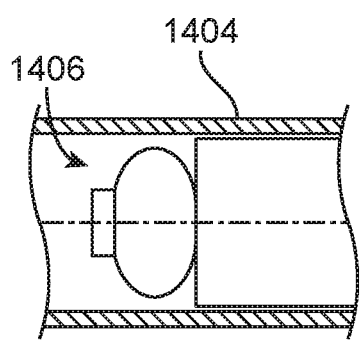
FIG. 15 is an elevation view of the coupler of FIG. 14 in an uncoupled configuration.
Figure 13:
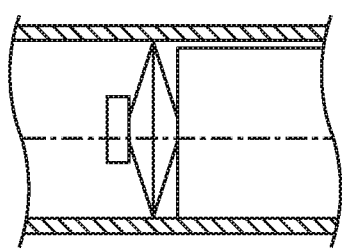
FIG. 13 is an elevation view of the coupler of FIGS. 11 and 12 in a coupled configuration.
Figure 16:
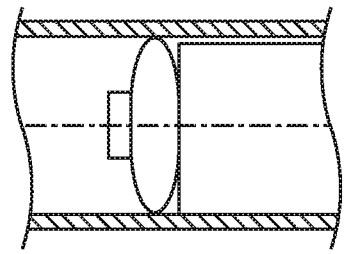
FIG. 16 is an elevation view of the coupler of FIGS. 14 and 15 in a coupled configuration.

FIGS. 11-27 illustrate exemplary alternative embodiments of connection mechanisms that may be utilized in various quick-release mechanisms disclosed herein to selectively couple and decouple one or more portions of a lift mechanism of a corresponding quick-release covering system. FIGS. 11-16 illustrate exemplary expandable connection mechanisms, with FIGS. 11-13 showing example first expandable connection mechanism 1100 having expanding portion 1102 including a relatively rigid material, such as metal or plastic and FIGS. 14-16 showing example second expandable connection mechanism 1400 having expanding portion 1402 including a relatively flexible material, such as rubber. Both example expandable connection mechanism s may include a shaft (not shown) movable along an axis A3, A4, to thereby transition a first end of the respective connection mechanism from a decoupled configuration (FIGS. 12, 15) in which expanding portion 1102, 1402 has a first diameter to a coupled configuration, (FIGS. 13, 16), in which the expanding portion has a second, larger diameter. Example expandable connection mechanism s may be used in conjunction with a second member 1104, 1404 having, inner lumen 1106, 1406 with an inner diameter that is sized for sliding movement with one of connection mechanism s 1100, 1400, when the connection mechanism is in the decoupled state, and is sized to be fixedly coupled to the connection mechanism when the connection mechanism is in the coupled state.

Figure 23:
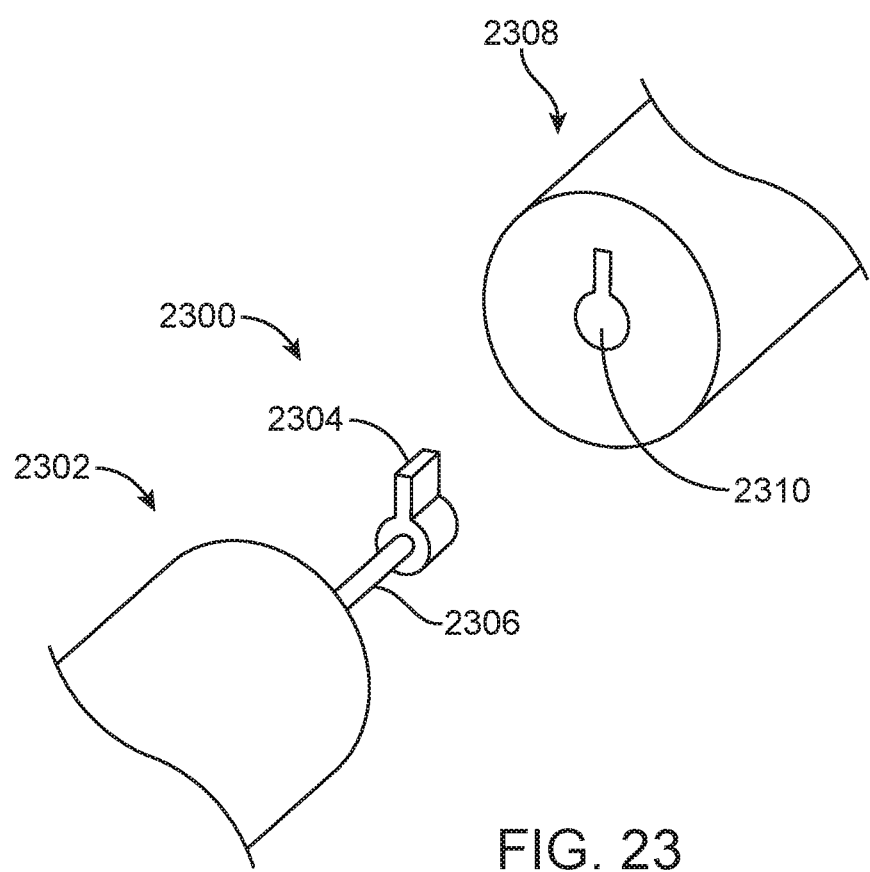
FIG. 23 is a perspective view of an example coupler.
Figure 24:
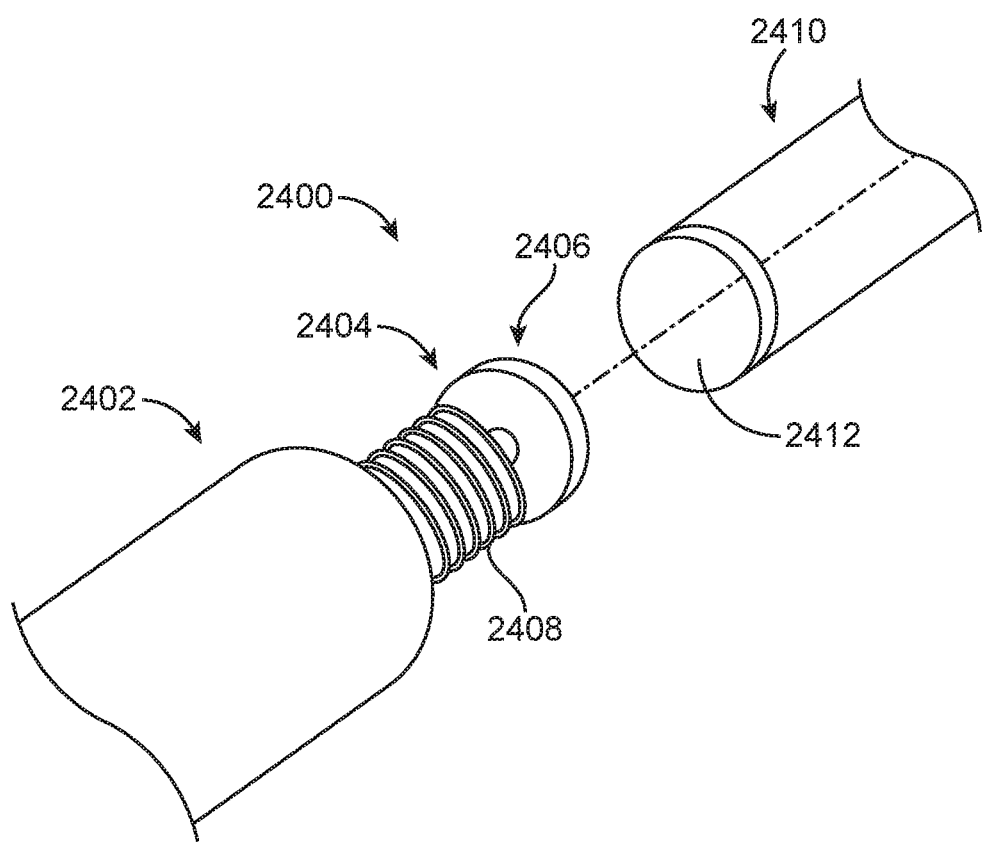
FIG. 24 is a perspective view of another example coupler.
Figure 25:
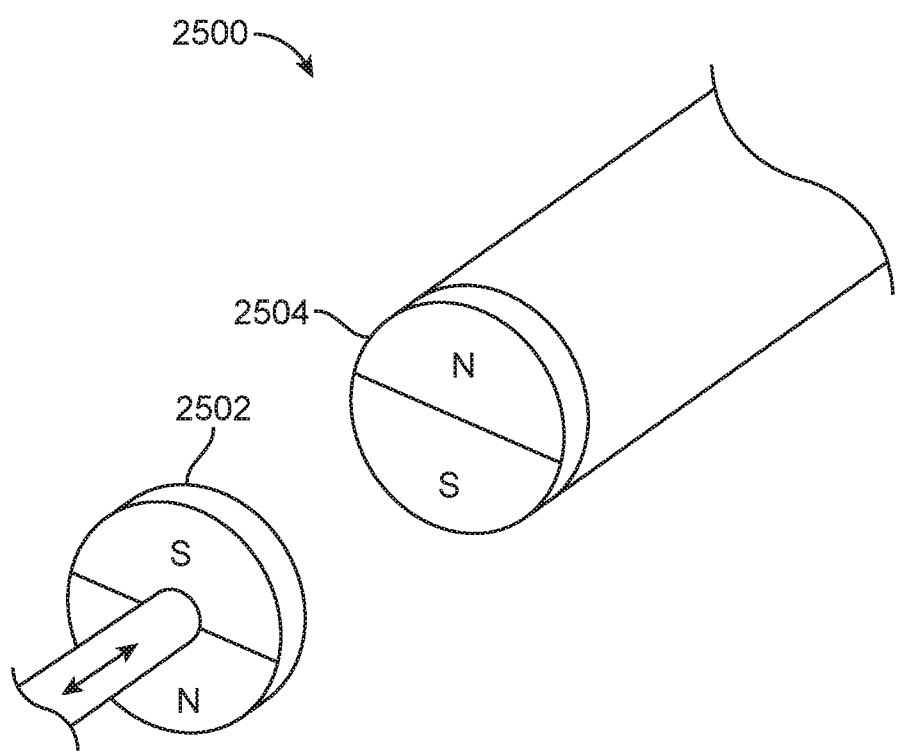
FIG. 25 is a perspective view of another example coupler.
Figure 26:
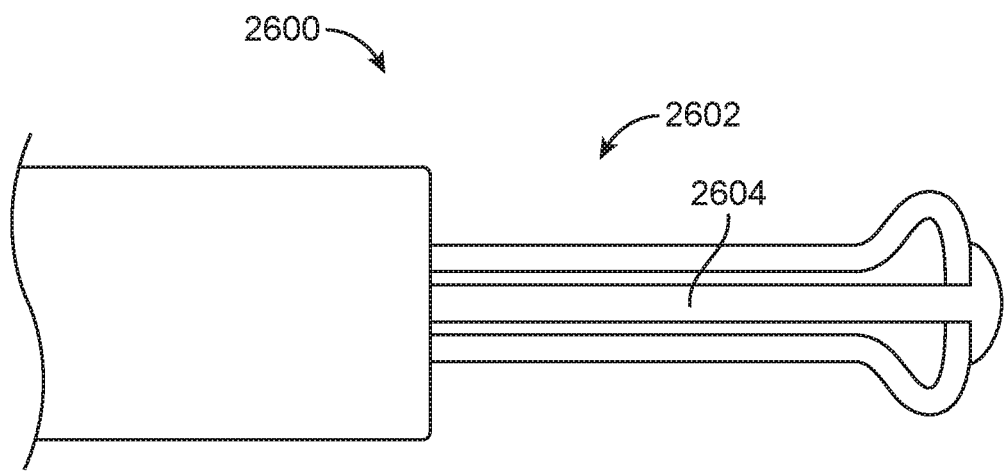
FIG. 26 is an elevation view of an example coupler in an uncoupled configuration.
Figure 27:
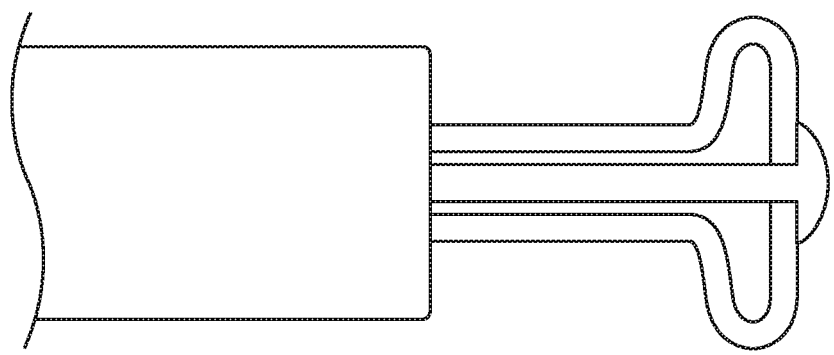
FIG. 27 is an elevation view of the coupler of FIG. 26 in a coupled configuration.

FIGS. 17-22 illustrate example connection mechanisms having alternative complementary protrusions and recesses for mating engagement. Example connection mechanism 1700 may include a first portion 1702 having tapered end 1704 with a tapered outer surface 1706 and recesses 1802 (FIG. 18) and a second portion 1708 having complementary features for an interference fit engagement with end 1702. Specifically, in the illustrated example, a cylindrical recess 1710 having outer and inner diameters 1712, 1714, the outer diameter being greater than an outer diameter of a first end 1804 of tapered end 1704 but less than an outer diameter of second end 1806 of the tapered end such that first and second portions 1702, 1708 may form an interference fit when joined as shown in FIG. 19. FIGS. 20-22 show an alternative connection mechanism 2000 including first and second portions 2002, 2004, with first portion having a conical end 2006 configured and dimensioned for an interference fit with a conical recess 2008 in second portion 2004. FIG. 23 illustrates an alternative connection mechanism 2300 having a keyed coupling including first portion 2302 having key 2304 located on rod 2306 and a second portion 2308 having a keyed recess 2310 sized for mating engagement with the key. In one embodiment, one or both of rod 2306 and first portion 2302 may be configured for axial movement relative to second portion 2308 such that key 2304 may be inserted into keyed recess 2310 to form a non-rotatable coupling between the first and second portions. FIG. 24 illustrates yet another exemplary connection mechanism 2400 including a first portion 2402 having a movable member 2404 coupled to friction disk 2406, the movable member being resiliently biased to an extended position by spring 2408 and a second portion 2410 having a corresponding friction disk 2412. In use, friction disks 2406, 2412, may be brought into contact such that the friction surfaces on the friction disks prevent or inhibit relative rotation between portions 2402, 2410. Spring 2408 aids the coupling by forcing the disks together. FIG. 25 illustrates yet another alternative coupling 2500 having first and second magnetic members 2502, 2504, wherein at least one of the magnetic members may be axially moveable relative to the other to transition between a coupled and decoupled state. FIGS. 26 and 27 illustrate an alternative expandable connection mechanism 2600, including expanding portion 2602 and shaft 2604 movable between decoupled configuration (FIG. 26) and coupled configuration (FIG. 27). Example expandable coupler 2600 may be used in conjunction with a second member (not shown) having, for example an inner lumen with an inner diameter that is sized for sliding movement with connection mechanism 2600 when the connection mechanism is in the decoupled state and sized to be fixedly coupled to the connection mechanism when the connection mechanism is in the coupled state. In yet other embodiments, connection mechanisms may have one or more of a tapered male/female insert that expands to engage a wall of a tube; a male disc having small half sphere protrusion(s) that engages one of several detents in female disc; conical male/female insert(s) that expand to engage wall of tube; something similar to a molly bolt and includes a piece of material attached to piston on actuator and that gets smaller as actuator moves out and larger as actuator moves in; an elastic sphere that that is attached to piston on an actuator and that gets smaller as actuator moves out and larger as actuator moves in; an insert having ferrous metal that electro magnet grips when holding shade in place and releases when electrical state changes; friction discs that when pressed tightly together hold shade in position, when pressure is reduced they allow shade to drop; and ball bearing(s) with spring(s) behind attached to actuator, the ball bearing(s) being configured to engage detents in a disc that engages wall of tube.

Figure 28:
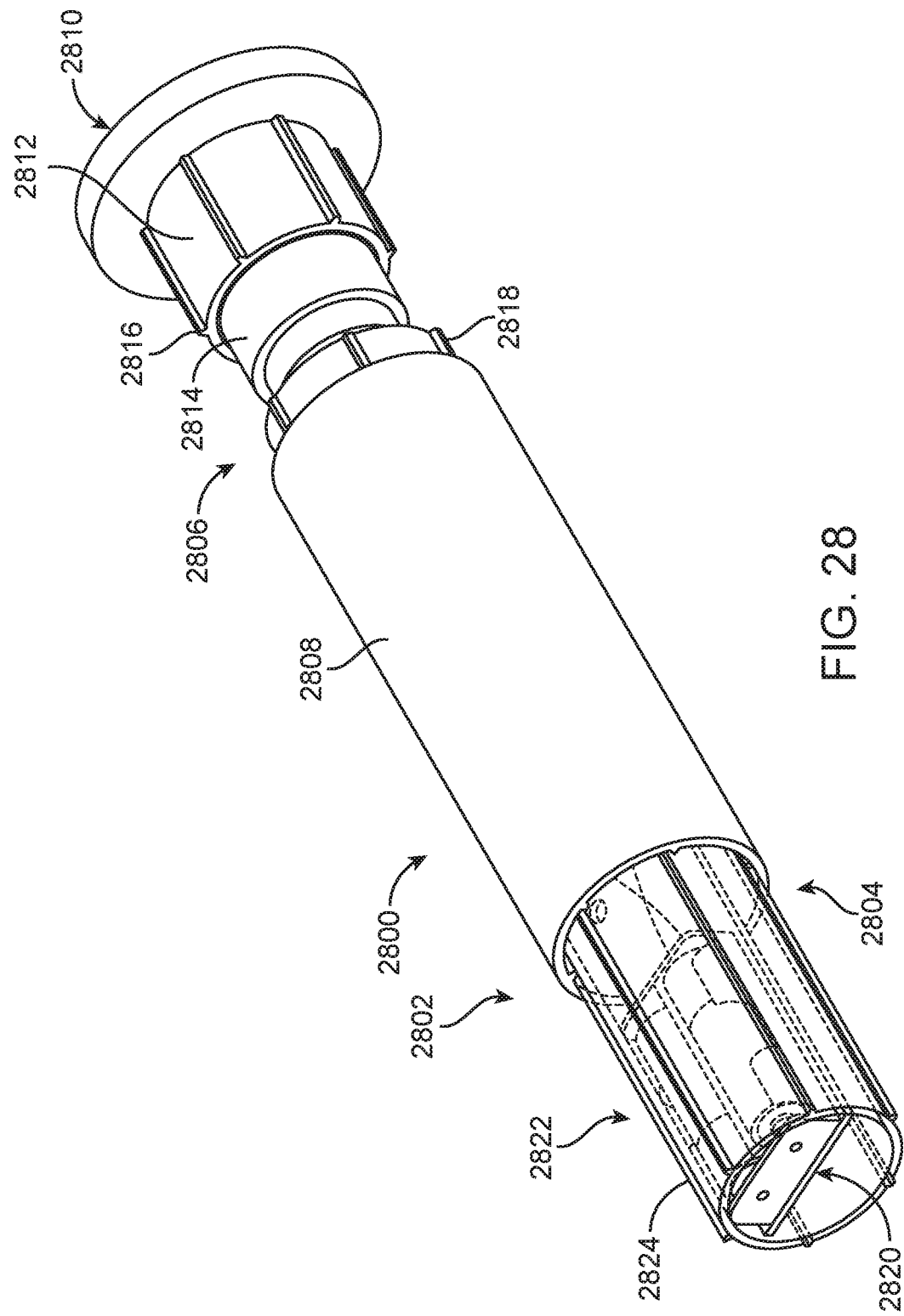
FIG. 28 is a perspective view of an example quick-release architectural covering system.
Figure 29:
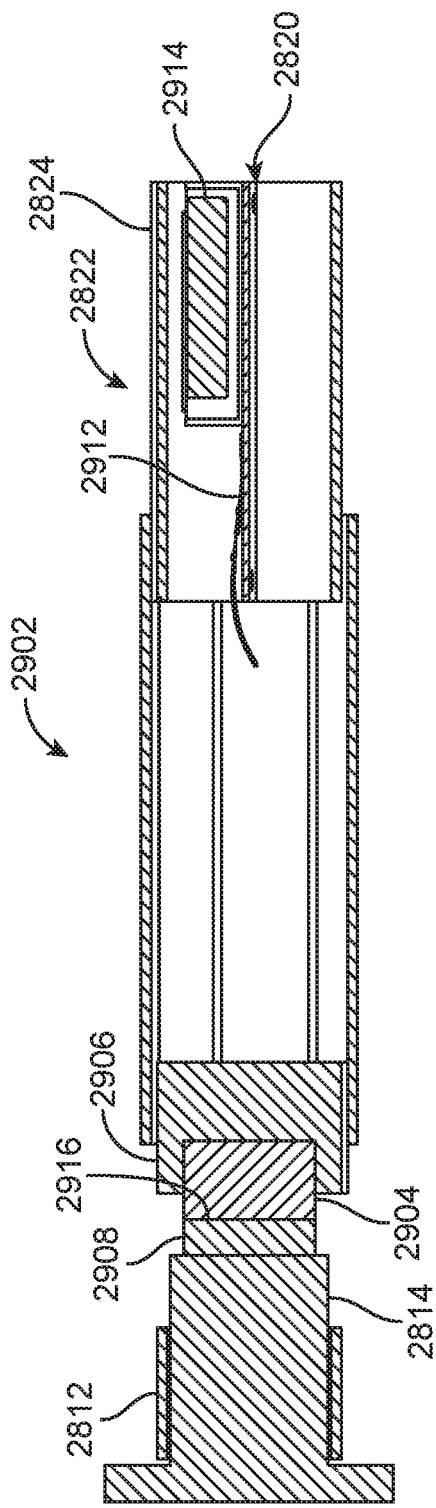
FIG. 29 is a cross sectional view of the system of FIG. 28.

FIGS. 28-29 illustrate an alternative quick-release covering system 2800. System 2800 may include head rail 2802, only a portion of which is shown for ease of illustration. Head rail 2802 corresponds to head rail 106 and is configured for a roller shade covering having, for example, a covering material and bottom rail, which are not shown for clarity. Head rail 2802 may include a control system which may include roller-shade-type lift mechanism 2804 and quick-release mechanism 2806. Unlike example system 300, which has a quick release mechanism having an electromechanical coupler, illustrated quick release mechanism 2806 has an electromagnetic coupler 2902 which, as discussed below, may include electromagnet 2904 and disk 2908. Lift mechanism 2804 may include elongate tube 2808, clutch 2810, and a clutch member, such as a lift cord (not shown). For ease of comparison, elongate tube 2808 and clutch 2810 correspond to elongate member 202 an clutch 204 (FIG. 2). Clutch 2810 may be configured to rotate elongate tube 2808 in response to a force from a user or motor, and otherwise preventing the tube from rotating when the clutch is not being rotated by a clutch member or motor. Example Lift mechanism 2804 may also include clutch bushing 2812, which is configured to align the elongate tube with clutch barrel 2814 of clutch 2810. Example bushing 2812 may have axial ridge mating features 2816 configured for sliding engagement with axial recesses located on an inner wall of tube 2808 for coupling the bushing to elongate tube such that, during use, the bushing rotates with the tube and provides a bearing surface between the tube and clutch barrel 2814.

Quick-release mechanism 2806 may be configured to releasably couple elongate tube 2808 and clutch 2810 so that, when coupled, during, for example, normal operation, the clutch may be used to rotate the elongate tube to raise and lower a covering coupled to the tube, and when decoupled, the elongate tube may be allowed to rotate relative to the clutch so that, for example, a bottom rail coupled to the covering is allowed to fall under the pull of gravity, thereby rotating the elongate tube and quickly transitioning the covering to a fully extended position. Example quick-release mechanism 2806 may include electromagnetic coupler 2902 (FIG. 29) which may include electromagnet 2904 disposed within electromagnet housing ("EM housing") 2906, which is configured to magnetically couple to ferrous disk 2908. EM housing 2906 may be non-rotatably coupled to elongate tube 2808 and may be configured and dimensioned to be disposed within the elongate tube to rotate therewith. Example EM housing 2906 may be coupled to elongate tube 2808 with complementary features 2818 that, in the illustrated embodiment, allow relative axial movement for example, for ease of installation, while preventing relative rotational movement. Example complementary features 2818 include a plurality of axial ridges extending along an outer surface of EM housing 2906 and being substantially parallel to a central longitudinal axis of the EM housing and complementary-shaped axial recesses extending along an inner surface of elongate tube 2808. Alternative embodiments may include alternative structures for preventing relative rotational movement of EM housing 2906 and elongate tube 2808.

Electromagnet 2904 may be configured to magnetically releasably couple to ferrous disk 2908, which is non-rotatably coupled to clutch barrel 2814 such that, when electromagnet 2904 is magnetically coupled to disk 2908, rotation of the clutch barrel may cause elongate tube 2808 to rotate to thereby raise and lower a bottom rail and covering (not shown) attached to the elongate tube. When electromagnet 2904 is magnetically de-coupled from disk 2908, elongate tube 2808 and clutch 2810 are no longer non-rotatably coupled, and elongate tube is free to rotate relative to clutch barrel 2814 and is rotatably supported by clutch bushing 2812. Quick-release mechanism 2806 may also include control unit 2912 disposed within electronics housing 2822 for housing the control unit and associated electronics. Example electronics rotation housing 2822 is coupled to elongate tube 2808 in a similar fashion as EM housing 2906 with axial ridges 2824 configured to slidably couple with recesses on an inner diameter of the elongate tube so that the electronics housing rotates with the tube. Electronics housing 2822 is spaced apart from EM housing 2906 which may facilitate electronics housing being located proximate an end of tube 2808, which may facilitate connections to external components such as an antenna or external power connections, and may also facilitate replacement of batteries in power source 2914. Control unit 2912 may be configured to receive a trigger signal from a remote source and thereby activate or deactivate electromagnet 2904 in response to the signal. In one embodiment, electromagnet 2904 may be a "reverse" electromagnet, wherein the electromagnet is configured to generate a magnetic field and be coupled to disk 2908 when de-energized, and when energized by receipt of power from power source 2914, the electromagnet may be configured to eliminate, cancel, or otherwise modify the magnetic field such that the electromagnet may be decoupled from the disk. Thus, in one example, quick-release mechanism 2806 may be configured to be magnetically coupled to clutch 2810 when no power is being sent to electromagnet 2904 and may be configured to decouple elongate tube 2808 from the clutch when power is sent to the electromagnet. In alternative embodiments, electromagnet

2904 may have the opposite configuration, wherein the electromagnet magnetically couples to disk 2908 when energized and decouples when power is removed. Electromagnet 2904 may be configured to ensure adequate magnetic holding force for the particular implementation, while minimizing electrical power requirements, particularly when powered by battery. In one example, electromagnet may have a voltage requirement of 10V-24V, a power requirement of 3 W-20 W and a holding force of 0.1 kgs-50 kgs, with specifications varying with application. By way of non-limiting example, in some embodiments, a reverse electromagnet from Jinsen Electronics® model JSP-2525K or model JSP-4040K may be used. In the illustrated embodiment, electromagnet 2904 and disk 2908 couple together at interface 2916. In the example shown, both electromagnet 2904 and disk 2908 have a substantially circular cross section and substantially planar surface for forming interface 2916. In some embodiments, one or more of the mating surfaces of the magnet and disk may have features that augment the magnetic field generated by the magnet and help prevent relative rotational movement when coupled. For example, one or more of the mechanical coupling features disclosed in FIGS. 9-24, 26*m* and 27 could be included. In yet other embodiments, complementary shaped stepped or angled surfaces may be included on the faces of the magnet and disk to prevent relative movement. In some embodiments, a spring may also be included to facilitate disengagement of the additional mechanical features when the magnetic field is eliminated or cancelled out so the tube 2808 may decouple from clutch 2810.

Control unit 2912 may include a microprocessor and transceiver and may be operably coupled to power source 2914, an antenna (not shown) and electromagnet 2904. In the illustrated example, power source 2914 is a battery for powering control unit 2912 and electromagnet 2904. In alternative embodiments, quick-release mechanism 2806 may be hard-wired and receive power from an external power source. In such an alternative embodiment, an electrical connection may be provided that facilitates relative rotational movement between electronics housing 2822 and wiring extending from an eternal source, such as an electrical slip ring connection, and/or, coiled cabling configured to allow some degree of twisting. In one example, control unit 2912 is configured to provide power to electromagnet 2904 in response to a trigger signal to thereby decouple the electromagnet from disk 2908. In other examples, control unit 2912 may also be configured to control a descent of the shade to a fully extended position by controllably cycling or pulsing electric power to electromagnet 2904 to repeatably couple and decouple the magnet, for example, by coupling the magnet and disk for brief intervals, such as, for example, $\frac{1}{20}$-$\frac{1}{2}$ or $\frac{1}{15}$-$\frac{1}{5}$ or $\frac{1}{10}$-$\frac{1}{7}$ second intervals.

Figure 30:
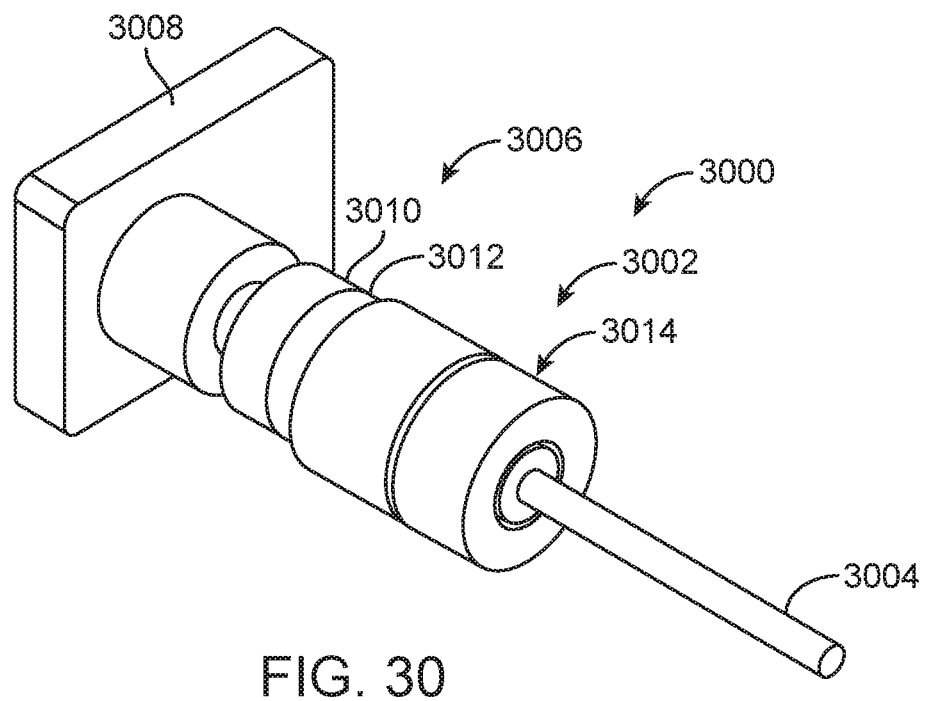
FIG. 30 is a perspective view of portions of a quick-release mechanism of an example quick-release architectural covering system.
Figure 31:
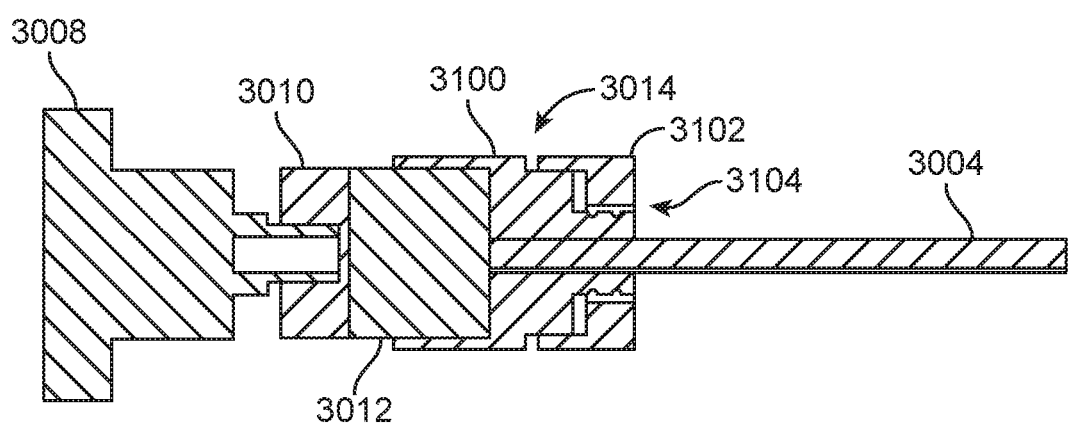
FIG. 31 is a cross sectional view of the mechanism of FIG. 30.

FIGS. 30 and 31 illustrate portions of alternative control system 3000 including electromagnet quick-release mechanism 3002 configured for use in a shade system having elongate shaft 3004, such as, for example, a cellular shade covering system. Control system 3000 may include lift mechanism 3006, which may include clutch 3008 and elongate shaft 3004, which, for ease of comparison, correspond to clutch 204 and elongate member 202, respectively. Quick-release mechanism 3002 may include ferrous disk 3010 which may be non-rotatably coupled to clutch 3008 and electromagnet 3012, which may be non-rotatably coupled to elongate shaft 3004. Electromagnet 3012 is configured to rotate with elongate shaft 3004 and may be electrically coupled to a power source and control system (not shown) via slip ring 3014, which includes rotating portion 3100 and non-rotating portion 3102 (FIG. 31). In this example, electrical wiring (not shown) may be attached to non-rotating portion 3102 of slip ring 3014, and the electrical signal may be transferred from the non-rotating portion to rotating portion 3100 via electrical connection 3104. As best seen in FIG. 31, elongate shaft 3004 extends through slip ring 3014, the slip ring having bearing surface for relative rotational movement with the rod. In one example, quick-release mechanism 3002 may be used in a cellular shade system such as system 300 (FIG. 2) in lieu of connection mechanism 320 and linear actuator 322.

Figure 32A:
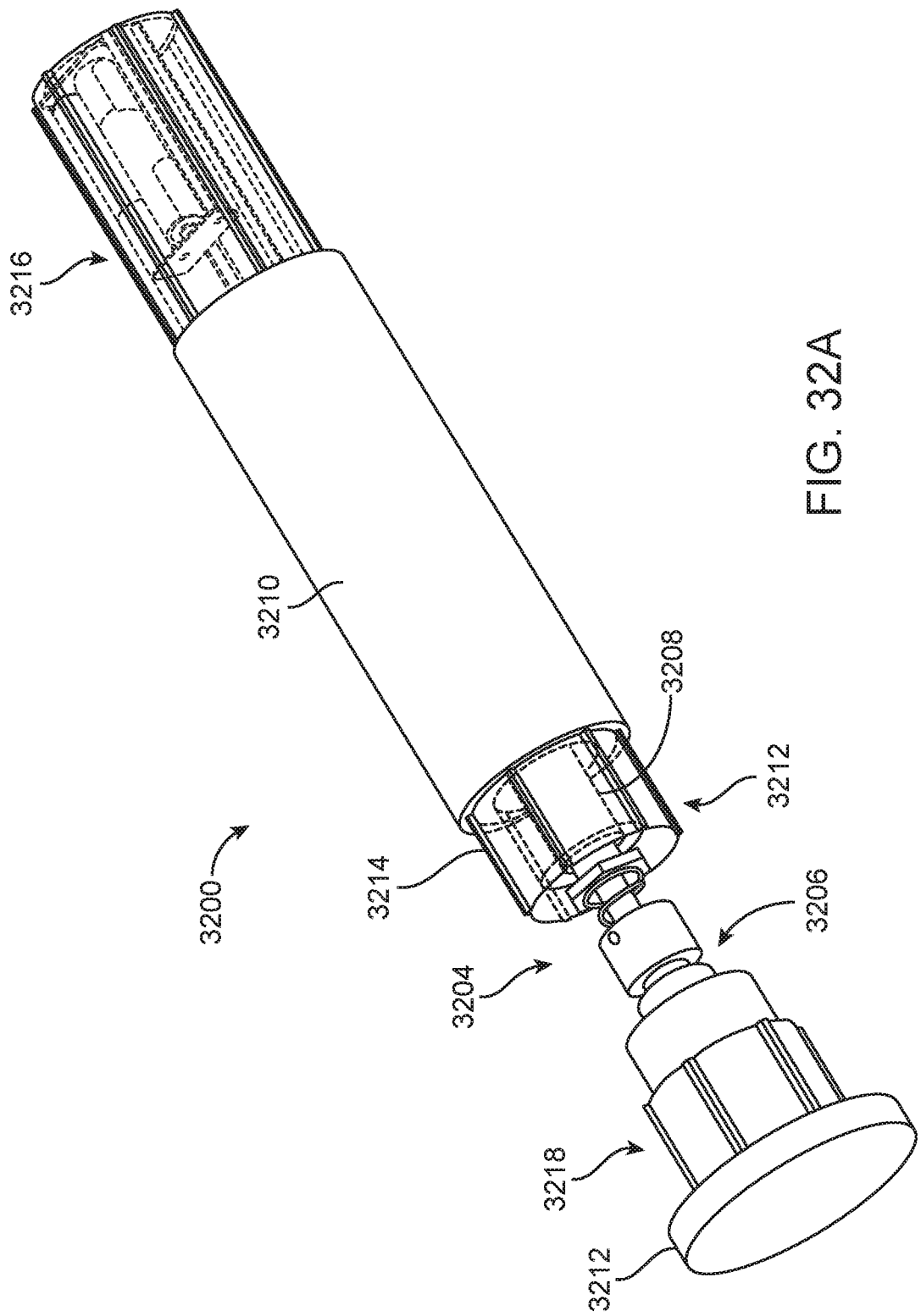
FIG. 32A is a perspective view of another example quick-release architectural covering system.
Figure 32B:
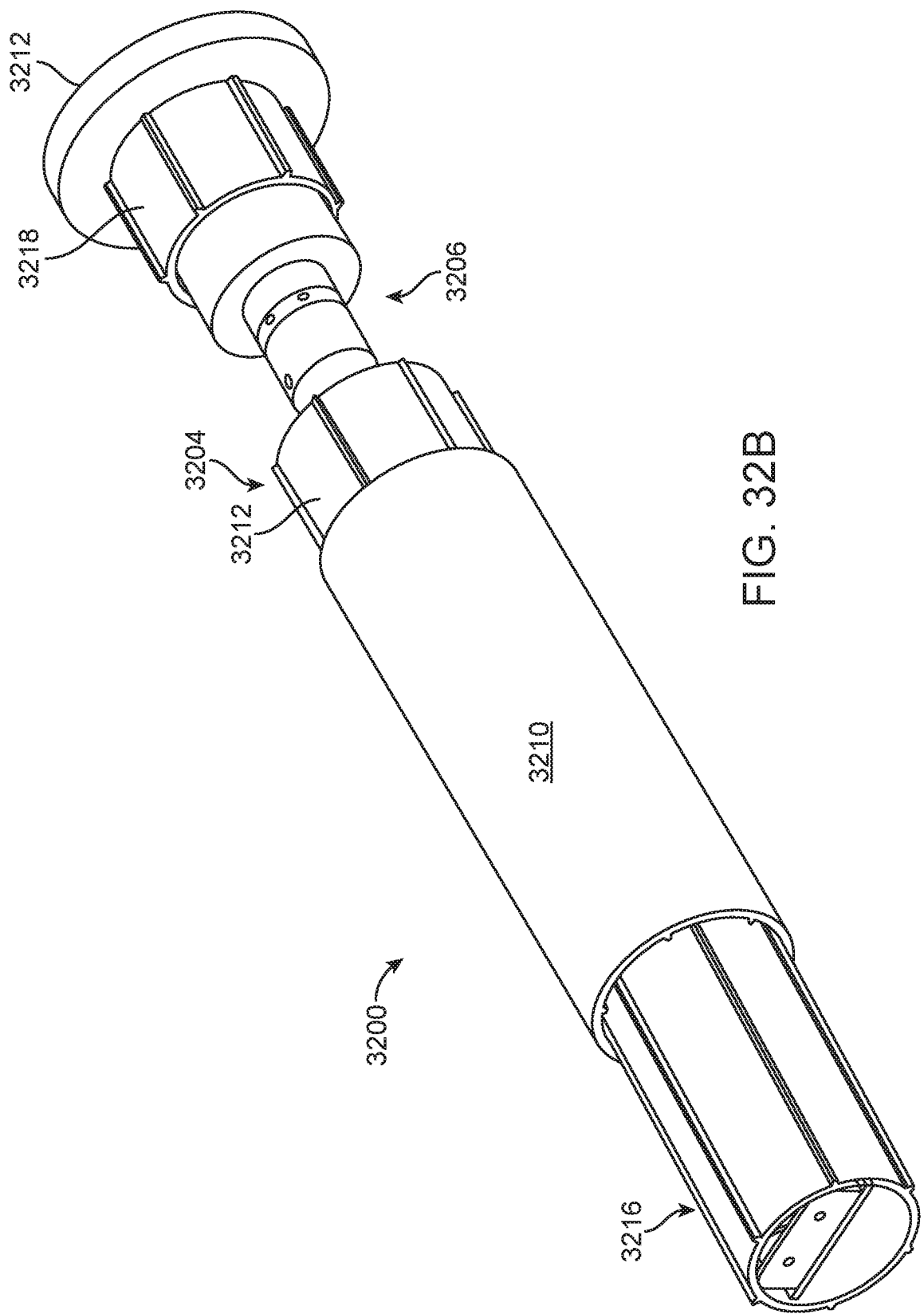
FIG. 32B is another perspective view of the system of FIG. 32A.
Figure 33:
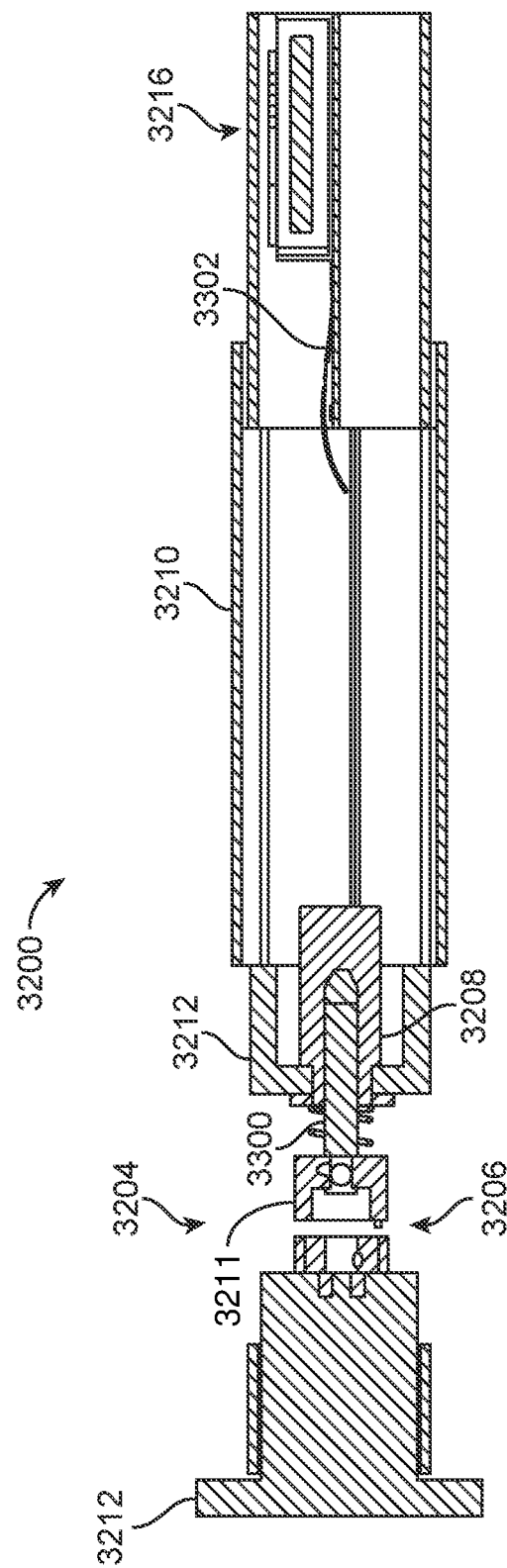
FIG. 33 is a cross sectional view of the system of FIGS. 32A and 32B.

FIGS. 32A, 32B, and 33 illustrate yet another alternative covering system 3200 having features similar to system 2800 and being configured for use in a roller-shade covering system, however, unlike quick-release mechanism 2806, which includes electromagnet 2904, example quick-release mechanism 3202 may include electromechanical coupling assembly 3204 having features similar to quick-release mechanism 318, including connection mechanism 3206 and linear actuator 3208, however, quick-release mechanism 3204 is configured for use with shade systems having lift mechanisms including elongate tubes such as elongate tube 3210, for example, various roller shade designs. Similar to mechanism 318, connection mechanism 3206 is configured to releasably couple clutch 3212 and tube 3210, with shaft 3300 of linear actuator 3208 (FIG. 33) being coupled to a first hub 3211 of the connection mechanism to controllably move the connection mechanism between a coupled and uncoupled configuration. Linear actuator 3208 is disposed within actuator housing 3212 which is non-rotatably coupled to tube 3210 with axial rides 3214. System 3200 may also include electronics housing 3216 which has a similar configuration and function as electronics housing 2822 (FIG. 28). As with system 2800, tube 3210 is configured to be rotatably disposed on clutch 3212 by clutch bushing 3218 such that when control unit 3302 (FIG. 33) activates actuator 3208 to thereby decouple connection mechanism 3206, the tube is decoupled from the clutch, and may freely rotate about the clutch while being supported by the clutch bushing.

As with other embodiments disclosed herein, quick-release mechanism 2806 may be configured to activate actuator 3208 upon receipt of a triggering signal to thereby cause actuator 3208 to decouple coupler 3206, which may decouple elongate tube 3210 from clutch 3212, thereby allowing a bottom rail (not shown) attached to the tube to fall under the weight of gravity and transition the shade to a fully extended position.

FIGS. 34 and 35 illustrate an alternative system and method for modifying an existing roller shade to create quick-release shade system 3400. FIG. 34 illustrates in exploded perspective view various components of a quick-release security shade 3400 that can be made according to an embodiment of the invention by modifying portions of an existing shading assembly. In the example shown, plate 3402, made from a ferrous material, can be secured to the end of housing 3404 of driving portion 3406 so as to rotate with the housing using, for example, couplings 3408 which may engage housing 3404 through, for example, a snap fit, by means of glue (not shown), and/or by other known means suitable for securing parts to one another. Sleeve 3410 may be created by removing keys (not shown) arranged on inner surface 3412 of sleeve 3410 that may be found in an existing roller shade that does not have a quick release mechanism, such that modified sleeve 3410 may be slidably disposed over housing 3404 and rotate relative to the housing. Sleeve 3410 may have an outside diameter that is sized relative to an inside diameter of tube 3414 in which it is received so that is axially and rotationally fixed with respect to the tube. Example sleeve 3410 functions as a bushing, permitting housing 3404 of driving portion 3406 to rotate freely therein relative to the sleeve and the tube to which the sleeve is attached.

An electromagnet 3416, the magnetic field of which may be altered, e.g., turned on and off, by applying or removing power, as desired, may be secured at a predetermined position within tube 3414 of an existing shading assembly such that the electromagnet abuts plate 3402 and rotates with the tube. When operated to generate a magnetic field, electromagnet 3416 non-rotatably couples driving portion 3406 and tube 3414. More particularly, driving portion 3406 non-rotatably drives electromagnet 3416 which, in turn, drives tube 3414 attached to the electromagnet so as to rotate therewith. Electromagnet 3416 is selected so that the magnetic field it generates is sufficiently strong to ensure the electromagnet remains rotatably coupled with plate 3402. Thus, factors such as inherent friction in shade system, the weight of the shade, the greatest rotational force likely to be applied to driving portion 3406, and other factors apparent to those skilled in the art will influence the selection of the electromagnet. In one embodiment, electromagnet 3416 generates a magnetic force of 50 N·m, while in other embodiments the electromagnet may generate more or less force, e.g., 0.1-200 N·m, as appropriate. In the illustrated embodiment, electromagnet 3416 generates a magnetic field except when power is applied. Alternatively, an electromagnet 3416 that generates a magnetic field only when power is applied may be used in the alternative.

FIG. 35 illustrates an assembled version of the quick-release security shade 3400 shown in FIG. 34. Electromagnet 3416 may, in a wireless control embodiment, be connected via connection 3502 to an internal controller 3504 with an RF receiver (discussed more below) and an internal battery 3506. Controller 3504 is connected to antenna 3508 to receive an RF activation signal. Antenna 3508 may be fed through an end cap 3510 of tube 3414, the end cap being designed and configured to be secured to the tube such that the endcap rotates with the tube and to be rotatably secured to a wall or mount (not shown) such that the tube and end cap may rotate relative to the wall or mount. As discussed more below, in wired embodiments of security shade 3400 electrical connection 3502 may be wired directly to a centralized controller via end cap 3510.

Figure 36:
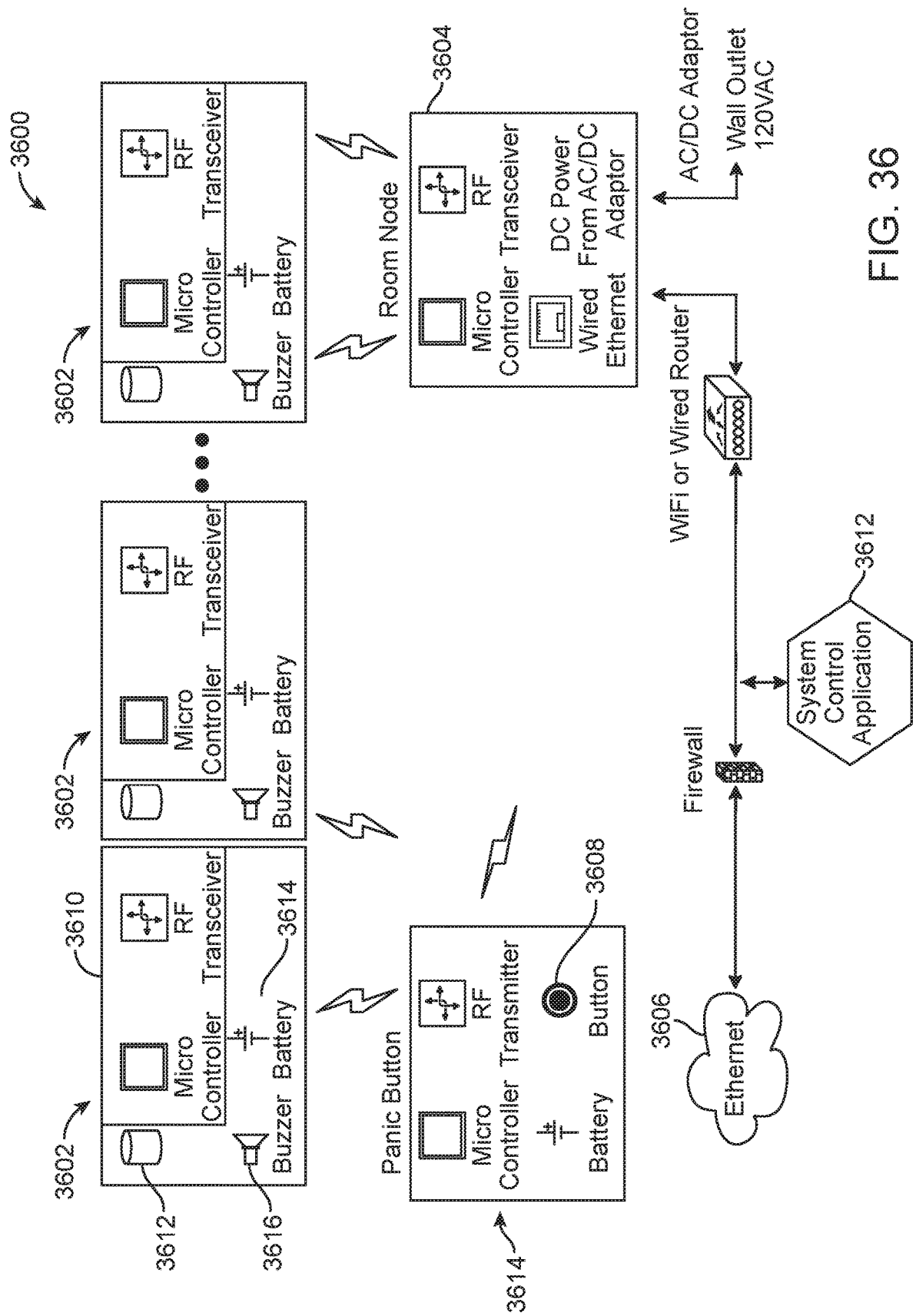
FIG. 36 is a conceptual diagram of a central control system for a quick-release architectural opening covering control system.

FIG. 36 illustrates an example control system 3600 for controlling a quick-release covering system including a plurality of quick-release architectural opening coverings. As shown in FIG. 36, each of the plurality of coverings may have quick-release mechanism electronics 3602 for receiving triggering signals and controlling corresponding quick-release mechanisms. In the illustrated embodiment, electronics 3602 may include control unit 3610, which may include a micro controller which may be programmed, for example, with embedded firm ware, and an RF transceiver. The control unit 3610 being operably connected to coupling assembly 3612, such as an electromagnet or linear actuator, a power source such as a battery 3614, and in some embodiments, a buzzer 3616 (the components of only one quick-release mechanism electronics 3602 being labelled to avoid clutter). One or more quick-release mechanism electronics 3602 may be located in a given area, such as within a room of a building, and may have a corresponding room node controller 3604 for controlling a corresponding group of shades. As shown, room node controller 3604 may include a micro controller, RF transceiver, and a wired Ethernet connection. Room node controller 3604 may in turn be connected to a centrally-located control system 3612 configured to communicate with all of control units 3610 either wirelessly or over a wired system. External access to central control system 3612 may be provided via, for example, network 3606 which may be, for example, an Ethernet, intranet, or the internet. In alternative embodiments, one or more of room nodes 3604 may be omitted and shade control units 3610 may communicate directly with central controller 3612. In the illustrated example, each of control units 3610 are configured to send and receive RF signals and control the dropping of a corresponding covering. Example room node controller 3604 may be configured to send and receive RF signals with corresponding control units 3610 and may include wired power, antenna, microprocessor, which may include embedded firmware, a wired ethernet port, and transceiver. In alternative embodiments, one or more of control units 3610, panic button 3614 and room node controller 3604 may be configured to wirelessly send and/or receive information by any other wireless communication means, including any other wireless other than RF, including infrared.

Control system 3600 may also include one or more panic button controllers 3614 that may include a button 3608 that, when pressed, sends a wireless signal one or more of shade controllers 3602. Example panic button controller may include a power source, microprocessor, which may include embedded firmware, antenna, and RF transmitter.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 37:
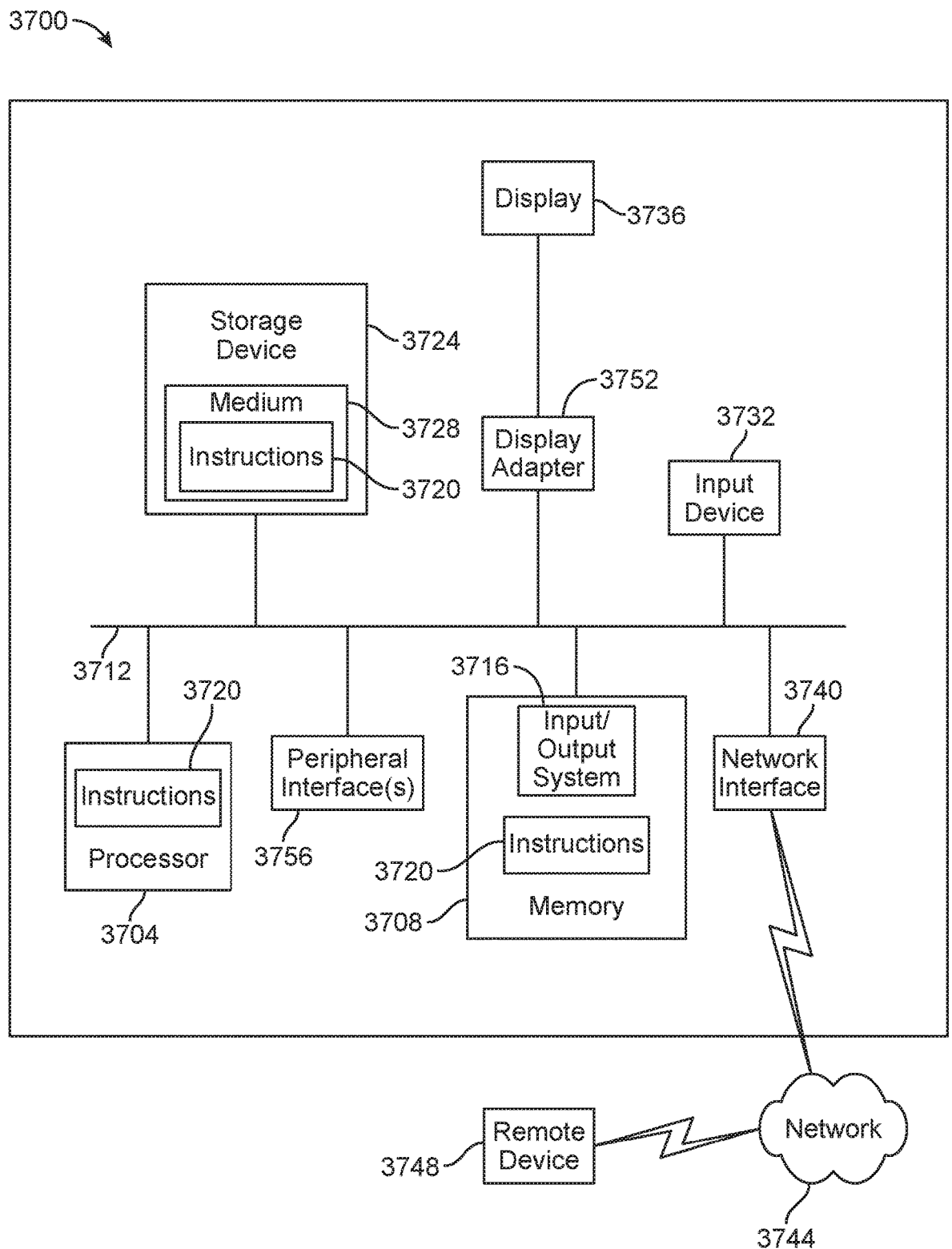
FIG. 37 a block diagram of a computing system that can be used to implement various aspects of the systems, devices, and methods disclosed herein.

FIG. 37 shows a diagrammatic representation of one embodiment of a computing device in the exemplary form of a computer system 3700 within which a set of instructions for causing a control system, such as the shade system 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 3700 includes a processor 3704 and a memory 3708 that communicate with each other, and with other components, via a bus 3712. Bus 3712 may include any of several types of bus structures including, but not limited to, a memory bus, a memory controller, a peripheral bus, a local bus, and any combinations thereof, using any of a variety of bus architectures.

Memory 3708 may include various components (e.g., machine-readable media) including, but not limited to, a random access memory component, a read only component, and any combinations thereof. In one example, a basic input/output system 3716 (BIOS), including basic routines that help to transfer information between elements within computer system 3700, such as during start-up, may be stored in memory 3708. Memory 3708 may also include (e.g., stored on one or more machine-readable media) instructions (e.g., software) 3720 embodying any one or more of the aspects and/or methodologies of the present disclosure. In another example, memory 3708 may further include any number of program modules including, but not limited to, an operating system, one or more application programs, other program modules, program data, and any combinations thereof.

Computer system 3700 may also include a storage device 3724. Examples of a storage device (e.g., storage device 3724) include, but are not limited to, a hard disk drive, a magnetic disk drive, an optical disc drive in combination with an optical medium, a solid-state memory device, and any combinations thereof. Storage device 3724 may be connected to bus 3712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 3724 (or one or more components thereof) may be removably interfaced with computer system 3700 (e.g., via an external port connector (not shown)). Particularly, storage device 3724 and an associated machine-readable medium 3728 may provide nonvolatile and/or volatile storage of machine-readable instructions, data structures, program modules, and/or other data for computer system 3700. In one example, software 3720 may reside, completely or partially, within machine-readable medium 3728. In another example, software 3720 may reside, completely or partially, within processor 3704.

Computer system 3700 may also include an input device 3732. In one example, a user of computer system 3700 may enter commands and/or other information into computer system 3700 via input device 3732. Examples of an input device 3732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 3732 may be interfaced to bus 3712 via any of a variety of interfaces (not shown) including, but not limited to, a serial interface, a parallel interface, a game port, a USB interface, a FIREWIRE interface, a direct interface to bus 3712, and any combinations thereof. Input device 3732 may include a touch screen interface that may be a part of or separate from display 3736, discussed further below. Input device 3732 may be utilized as a user selection device for selecting one or more graphical representations in a graphical interface as described above.

A user may also input commands and/or other information to computer system 3700 via storage device 3724 (e.g., a removable disk drive, a flash drive, etc.) and/or network interface device 3740. A network interface device, such as network interface device 3740, may be utilized for connecting computer system 3700 to one or more of a variety of networks, such as network 3744, and one or more remote devices 3748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 3744, may employ a wired and/or a wireless mode of communication. In general, any network topology may be used. Information (e.g., data, software 3720, etc.) may be communicated to and/or from computer system 3700 via network interface device 3740.

Computer system 3700 may further include a video display adapter 3752 for communicating a displayable image to a display device, such as display device 3736. Examples of a display device include, but are not limited to, a liquid crystal display (LCD), a cathode ray tube (CRT), a plasma display, a light emitting diode (LED) display, and any combinations thereof. Display adapter 3752 and display device 3736 may be utilized in combination with processor 3704 to provide graphical representations of aspects of the present disclosure. In addition to a display device, computer system 3700 may include one or more other peripheral output devices including, but not limited to, an audio speaker, a printer, and any combinations thereof. Such peripheral output devices may be connected to bus 3712 via a peripheral interface 3756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for controlling at least one window shade located adjacent a window in an area of a building, the window shade including a covering material and a lift mechanism for controlling a position of the covering material, the method comprising:
   operating the lift mechanism during a normal operation mode to raise and lower the covering material to control an amount of the window that is covered by the window shade to manage daylighting and thermal conditions of the area of the building;
   receiving, at a controller, a first signal;
   transmitting, with the controller, a trigger signal to the at least one window shade in response to receiving the first signal;
   automatically decoupling first and second portions of the lift mechanism in response to receipt of the trigger signal, to thereby release the covering material and allow the covering material to fall under the force of gravity towards a fully extended position to cover the window with the window shade and block visibility into the area through the window;
   wherein the at least one window shade includes an electromechanical actuator and a first connection member and the second portion includes an elongate tube having an inner wall that defines an interior volume, the electromechanical actuator and the first connection member located in the interior volume of the elongate tube, wherein the step of automatically decoupling includes moving the first connection member in a linear direction from a first position to a second position with the electromechanical actuator.

2. The method of claim 1, wherein the receiving step includes receiving the first signal from a gunshot detection system.

3. The method of claim 2, wherein the first signal is generated by an acoustic sensor of the gunshot detection system.

4. The method of claim 1, wherein the receiving step includes electronically receiving the first signal from an emergency response system communicatively coupled to the controller.

5. The method of claim 1, wherein the receiving step includes receiving the first signal from a panic button located inside or outside the building.

6. The method of claim 1, wherein the receiving step includes receiving the first signal from an emergency monitoring and detection system.

7. The method of claim 1, wherein the receiving step includes receiving the first signal from a wired or wireless remote control.

8. The method of claim 1, wherein the area is a classroom and the building is a school building.

9. The method of claim 1, wherein the at least one window shade includes a plurality of the at least one window shade located adjacent a plurality of corresponding respective windows, the transmitting step including simultaneously transmitting the trigger signal to each of the plurality of window shades to cause the covering material of each of the plurality of window shades to extend towards the fully extended position.

10. The method of claim 1, wherein the first portion includes a clutch having a first end disposed within the interior volume at a first end of the elongate tube to thereby support the first end of the elongate tube.

11. The method of claim 10, wherein the clutch includes a second end located outside of the elongate tube that has an outer width that is greater than an outer diameter of the elongate tube.

12. The method of claim 11, wherein the clutch further includes a clutch member operably coupled to the second end of the clutch, the clutch configured to transmit a user-generated force from the clutch member to the elongate tube.

13. The method of claim 1, wherein the first connection member is non-rotatably coupled to the elongate tube in the first position and rotatably coupled to the elongate tube in the second position.

14. The method of claim 1, wherein the first connection member includes protrusions and/or recesses that are engaged with complementary protrusions and/or recesses when in the first position and disengaged from the complementary protrusions and/or recesses when in the second position.

15. The method of claim 10, wherein the at least one window shade includes a clutch bushing disposed on the first end of the clutch, the clutch bushing having an outer wall that includes mating features that engage with mating features on the inner wall of the elongate tube and the clutch bushing includes an inner wall that defines a bearing surface that is in rotating engagement with the first end of the clutch, wherein the first connection member is positioned adjacent the clutch bushing, wherein the moving the first connection member with the electromechanical actuator from the first position to the second position includes moving the first connection member away from the clutch bushing.

16. The method of claim 1, wherein the linear direction is substantially parallel to a central longitudinal axis of the elongate tube.

17. The method of claim 1, further comprising, after the step of automatically decoupling, re-coupling the first and second portions and returning to the step of operating the lift mechanism during the normal operation.

18. The method of claim 17, wherein the step of re-coupling includes moving the first connection member with the electromechanical actuator from the second position to the first position.

* * * * *